US009682602B2

(12) United States Patent
Morita et al.

(10) Patent No.: US 9,682,602 B2
(45) Date of Patent: Jun. 20, 2017

(54) CONTROL APPARATUS FOR DAMPING FORCE VARYING DAMPER AND DAMPING FORCE VARYING DAMPER SYSTEM

(71) Applicant: Showa Corporation, Gyoda-shi (JP)

(72) Inventors: Takumi Morita, Haga-gun (JP); Atsushi Sakuma, Haga-gun (JP); Masaki Sugimoto, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/750,146

(22) Filed: Jun. 25, 2015

(65) Prior Publication Data

US 2016/0214454 A1 Jul. 28, 2016

(30) Foreign Application Priority Data

| Jan. 26, 2015 | (JP) | 2015-012024 |
| Jan. 27, 2015 | (JP) | 2015-012892 |
| Jan. 27, 2015 | (JP) | 2015-012893 |
| Jan. 27, 2015 | (JP) | 2015-012935 |
| Jan. 27, 2015 | (JP) | 2015-012938 |

(51) Int. Cl.
*B60G 17/018* (2006.01)
*B60G 17/015* (2006.01)
*B60G 17/08* (2006.01)

(52) U.S. Cl.
CPC ........... *B60G 17/015* (2013.01); *B60G 17/08* (2013.01); *B60G 2400/10* (2013.01);
(Continued)

(58) Field of Classification Search
CPC combination set(s) only.
See application file for complete search history.

(56) References Cited

U.S. PATENT DOCUMENTS 5,064,032 A * 11/1991 Ashiba .................... F16F 9/466
137/630.14
5,130,926 A * 7/1992 Watanabe ............. B60G 17/015
280/5.51

(Continued)

FOREIGN PATENT DOCUMENTS

| JP | 2009-023377 A | 2/2009 |
| JP | 2014-065387 A | 4/2014 |

*Primary Examiner* — Jonathan L Sample
(74) *Attorney, Agent, or Firm* — Leason Ellis LLP

(57) ABSTRACT

A control apparatus for a damping force varying damper includes a target current determining section, an upper limit setting section, and a supplied current determining section. The target current determining section determines a target current supplied to a solenoid valve that controls a damping force. The upper limit setting section sets an upper limit value for a current supplied to the solenoid valve. The supplied current determining section determines a supplied current, from the target current and the upper limit value. The upper limit setting section determines a coefficient that increases or reduces the upper limit value based on an already determined supplied current and then determines the upper limit value from the coefficient. The upper limit setting section determines a coefficient that increases or reduces the upper limit value based on an already determined supplied current and then determines the upper limit value from the coefficient.

23 Claims, 19 Drawing Sheets

(52) U.S. Cl.
CPC .... *B60G 2400/208* (2013.01); *B60G 2400/25* (2013.01); *B60G 2500/10* (2013.01)

(56) References Cited

U.S. PATENT DOCUMENTS

| | | | | |
|---|---|---|---|---|
| 5,174,598 | A * | 12/1992 | Sato | B60G 17/018 180/41 |
| 5,205,385 | A * | 4/1993 | Ashiba | F16F 9/46 188/266.5 |
| 5,390,948 | A * | 2/1995 | Kuriki | B60G 17/0182 280/5.508 |
| 5,586,627 | A * | 12/1996 | Nezu | B60G 17/08 188/266.6 |
| 5,697,634 | A * | 12/1997 | Kamimae | B60G 13/003 280/124.108 |
| 5,968,102 | A * | 10/1999 | Ichimaru | B60G 17/0152 280/5.5 |
| 6,016,454 | A * | 1/2000 | Ichimaru | B60G 17/015 280/5.514 |
| 6,067,490 | A * | 5/2000 | Ichimaru | B60G 17/018 188/266.2 |
| 6,208,497 | B1 * | 3/2001 | Seale | F01L 9/04 361/154 |
| 7,099,136 | B2 * | 8/2006 | Seale | F01L 9/04 123/90.11 |
| 9,114,846 | B1 * | 8/2015 | Ishikawa | B62K 25/283 |
| 2001/0043450 | A1 * | 11/2001 | Seale | F01L 9/04 361/160 |
| 2002/0008603 | A1 * | 1/2002 | Seale | F16K 31/0675 335/266 |
| 2004/0083993 | A1 * | 5/2004 | Seale | F01L 9/04 123/90.11 |
| 2007/0192030 | A1 * | 8/2007 | Tanimichi | B60W 10/18 701/301 |
| 2008/0004770 | A1 * | 1/2008 | Masamura | B60G 17/018 701/37 |
| 2008/0004771 | A1 * | 1/2008 | Masamura | B60G 17/018 701/37 |
| 2010/0026083 | A1 * | 2/2010 | Leiber | B60T 7/042 303/3 |
| 2013/0275003 | A1 * | 10/2013 | Uchino | B60G 17/06 701/40 |
| 2014/0083093 | A1 * | 3/2014 | Murakami | F15B 15/20 60/459 |
| 2015/0046034 | A1 * | 2/2015 | Kikuchi | B60G 17/0182 701/37 |
| 2015/0224845 | A1 * | 8/2015 | Anderson | B60G 17/019 701/37 |
| 2015/0259028 | A1 * | 9/2015 | Ishikawa | B62K 25/08 280/6.152 |
| 2015/0345587 | A1 * | 12/2015 | Yamazaki | F16F 9/512 701/37 |
| 2016/0214454 | A1 * | 7/2016 | Morita | B60G 17/015 |

* cited by examiner

CONTROL APPARATUS FOR DAMPING FORCE VARYING DAMPER AND DAMPING FORCE VARYING DAMPER SYSTEM

CROSS-REFERENCE TO RELATED APPLICATIONS

This application is based on and claims priority under 35 USC 119 from Japanese Patent Application No. 2015-012024 filed on Jan. 26, 2015, Japanese Patent Application No. 2015-012892 filed on Jan. 27, 2015, Japanese Patent Application No. 2015-012893 filed on Jan. 27, 2015, Japanese Patent Application No. 2015-012935 filed on Jan. 27, 2015, Japanese Patent Application No. 2015-012938 filed on Jan. 27, 2015, the entire contents of which are incorporated herein by reference.

BACKGROUND OF THE INVENTION

1. Technical Field

The present invention relates to a control apparatus for a damping force varying damper and a damping force varying damper system.

2. Related Art

A suspension apparatus of a vehicle such as an automobile includes a damper in order to appropriately reduce vibration transmitted from a road surface to a vehicle body during traveling to improve riding comfort and steering stability. The damper is provided with, for example, a partitioning member movably installed in a cylinder to partition the inside of the cylinder, a rod member connected to the partitioning member, and a liquid storage chamber that compensates for an amount of oil corresponding to the volume of the rod member in conjunction with movement of the rod member. The damper offers resistance to a flow of a liquid resulting from movement of the partitioning member to generate a damping force.

At this time, a change in the cross-sectional area of a channel through which the liquid flows changes the resistance of the flow of the liquid, enabling a change in damping force. Thus, a damping force varying damper has recently been proposed which utilizes the above-described phenomenon to allow the damping force to be varied.

For example, Patent Literature 1 (JP-A-2009-23377) describes a control apparatus for a damping force varying damper. In the control apparatus, a target current generating section searches for or sets a first upper limit current value corresponding to the amount of power generated by an alternator and then searches for or sets a second upper limit current value corresponding to a coil temperature. The target current generating section then selects a smaller one of the first and second upper limit current values as an upper limit current value. Then, when a basic target current exceeds the upper limit current value, the target current generating section sets the upper limit target value to be a target current and outputs a driving current according to the target current to an MLV coil in each damper.

To change the cross-sectional area of the channel, for example, a valve disc or the like may be provided in the channel and moved using a solenoid valve. The movement of the valve disc can be controlled by controlling a current passed through the solenoid valve.

However, when a large current is continuously passed through the solenoid valve, the coil, which is a component of the solenoid valve, is excessively heated and is likely to be short-circuited. Furthermore, durability of the coil is likely to be degraded.

SUMMARY OF THE INVENTION

An illustrative aspect of the present invention is to provide, for example, a control apparatus for a damping force varying damper which, when the solenoid valve is used to change the cross-sectional area of the channel, restrains the continuous passage of a large current through the solenoid valve, making the coil unlikely to be short-circuited.

An aspect of the present invention provides a control apparatus for a damping force varying damper including a target current determining section that determines a target current supplied to a solenoid valve that controls a damping force of the damping force varying damper, an upper limit setting section that sets an upper limit value for a current supplied to the solenoid valve, and a supplied current determining section that determines a supplied current supplied to the solenoid valve, from the target current and the upper limit value, in which the upper limit setting section determines a coefficient that increases or reduces the upper limit value based on an already determined supplied current and then determines the upper limit value from the coefficient.

Another aspect of the present invention provides a damping force varying damper system including a damping force varying damper with a solenoid valve that adjusts a damping force and a control apparatus that controls the solenoid valve, in which the control apparatus includes a target current determining section that determines a target current supplied to the solenoid valve, an upper limit setting section that sets an upper limit value for a current supplied to the solenoid valve, and a supplied current determining section that determines a supplied current supplied to the solenoid valve, from the target current and the upper limit value, in which the upper limit setting section determines a coefficient that increases or reduces the upper limit value based on an already determined supplied current and determines the upper limit value from the coefficient.

Any one of the aspects of the present invention can provide, for example, a damping force varying damper which, when the solenoid valve is used to change the cross-sectional area of a channel, makes a coil used in the solenoid valve unlikely to be short-circuited.

DETAILED DESCRIPTION OF THE INVENTION

Embodiments of the present invention will be described below in detail with reference to the attached drawings.

<Description of the Whole Vehicle>

Figure 1:
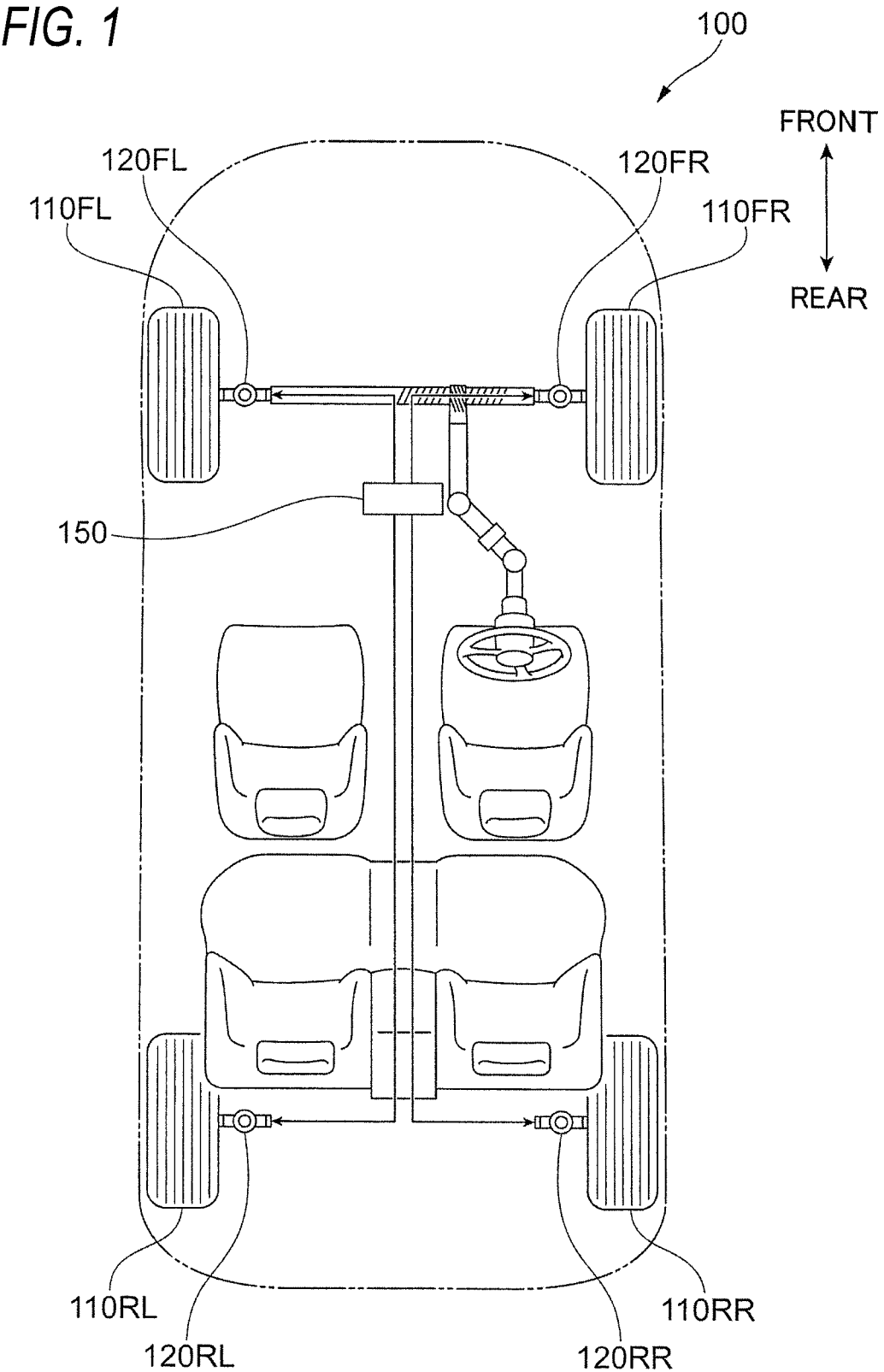
FIG. 1 is a diagram depicting a general configuration of a vehicle to which a damping force varying damper is applied.

FIG. 1 is a diagram depicting a general configuration of a vehicle 100 to which a damping force varying damper according to a first embodiment is applied.

The illustrated vehicle 100 includes four wheels, that is, a right front wheel 110FR, a left front wheels 110FL, a right rear wheel 110RR, and a left rear wheel 110RL. The right front wheel 110FR, the left front wheels 110FL, the right rear wheel 110RR, and the left rear wheel 110RL are provided with a right front suspension apparatus 120FR, a left front suspension apparatus 120FL, a right rear suspension apparatus 120RR, and a left rear suspension apparatus 120RL, respectively, each of which is an example of the damping force varying damper. When the right front wheel 110FR, the left front wheels 110FL, the right rear wheel 110RR, and the left rear wheel 110RL are not distinguished from one another, the wheels are hereinafter sometimes collectively referred to as the "wheel 110". Furthermore, when the right front suspension apparatus 120FR, the left front suspension apparatus 120FL, the right rear suspension apparatus 120RR, and the left rear suspension apparatus 120RL are not distinguished from one another, the suspension apparatuses are hereinafter sometimes collectively referred to as the "suspension apparatus 120".

Additionally, the vehicle 100 includes a control apparatus 150 that controls the damping force of the suspension apparatus 120. The control apparatus 150 is implemented by an electronic control unit (ECU) or the like.

Figure 2:
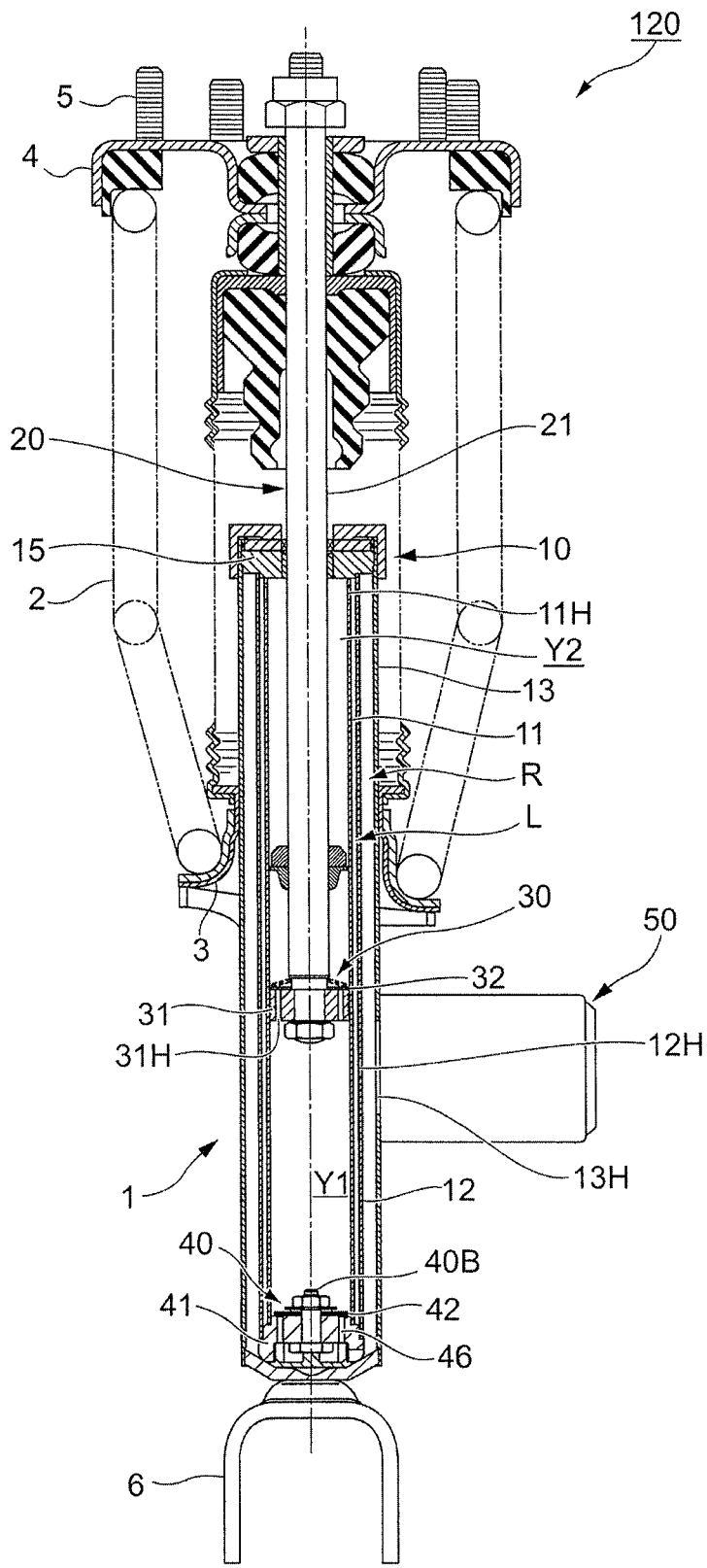
FIG. 2 is a diagram depicting a general configuration of a suspension apparatus.

FIG. 2 is a diagram depicting a general configuration of the suspension apparatus 120 according to the present embodiment.

[Configuration and Function of the Suspension Apparatus 120]

The suspension apparatus 120 includes a hydraulic shock absorber 1 and a coil spring 2 disposed outside the hydraulic shock absorber 1 as depicted in FIG. 2. The coil spring 2 is held by a spring sheet 3 and a spring sheet 4 provided at the respective opposite ends of the coil spring 2. The suspension apparatus 120 includes a bolt 5 that allows the suspension apparatus 120 to be attached to a vehicle body or the like, and wheel side attachment portion 6 provided under the hydraulic shock absorber 1.

[Configuration and Function of the Hydraulic Shock Absorber 1]

The hydraulic shock absorber 1 includes a cylinder portion 10, a piston rod 20, a piston 30, a bottom valve 40, and a solenoid valve 50, as depicted in FIG. 2.

(Configuration and Function of the Cylinder Portion 10)

The cylinder portion 10 includes a cylinder 11, an outer cylinder 12 provided outside the cylinder 11, and a damper case 13 provided outside the outer cylinder 12. The cylinder 11, the outer cylinder 12, and the damper case 13 are concentrically (coaxially) disposed.

The direction of a center axis of the cylinder of the damper case 13 is hereinafter simply referred to as the "axial direction". Furthermore, in the axial direction of the damper case 13, a lower end portion side in the figures is hereinafter referred to as a "first side". In the axial direction of the damper case 13, an upper end portion side in the figures is hereinafter referred to as a "second side".

The cylinder 11 (first cylinder) is provided such that the piston 30 is slidable along an inner peripheral surface of the cylinder 11. The piston 30 moves with an outer periphery of the piston 30 in contact with an inner periphery of the cylinder 11.

Furthermore, the cylinder 11 has a cylinder opening 11H serving as a channel through which oil flows to and from a communication path L described below, on the second end portion side and on the first side with respect to the rod guide 15.

The outer cylinder 12 is provided outside the cylinder 11 and on the inner side of the damper case 13. The outer cylinder 12 forms, between the outer cylinder 12 and the cylinder 11, the communication path L serving as an oil path between the inside of the cylinder 11 and a reservoir chamber R described below. Moreover, the outer cylinder 12 has an outer cylinder opening 12H at a position opposite to the solenoid valve 50.

The damper case 13 (second cylinder) houses the cylinder 11 and the outer cylinder 12 inside in the axial direction and a circumferential direction. The damper case 13 forms, between the damper case 13 and the outer cylinder 12, the reservoir chamber R which absorbs oil in the cylinder 11 and feeds the oil into the cylinder 11 to compensate for a volume of oil corresponding to advancing and retracting movement of the piston rod 20.

The damper case 13 has a case opening 13H at a position where the solenoid valve 50 (restricting mechanism) is attached. A solenoid cylinder 50S described below is attached to an outer periphery of the damper case 13 outside the case opening 13H. Furthermore, a suction port 52 and a joint member 12G both described below are passed through the case opening 13H.

(Configuration and Function of the Piston 30)

The piston 30 includes a piston body 31 and a valve 32 provided on a second end portion side of the piston body 31 in the axial direction.

The piston 30 is provided so as to be movable in the axial direction and partitions the space in the cylinder 11 into a first oil chamber Y1 and a second oil chamber Y2 for storing the liquid.

The piston body 31 has an oil path 31H formed in the axial direction. A plurality of (in the present embodiment, four) the oil paths 31H is formed at regular intervals in the circumferential direction to provide a path through which the oil flows via the piston body 31.

The valve 32 is provided at a second end portion of the piston body 31 and attached to a second side of the plurality of oil paths 31H.

(Configuration and Function of the Bottom Valve 40)

The bottom valve 40 includes a valve body 41 with a plurality of oil paths 46 formed in the axial direction, and a valve 42 that closes a second end portion, in the axial direction, of some of the plurality of oil paths 46 formed in the valve body 41, and a bolt 40B that fixes these members, as depicted in FIG. 2.

The valve body 41 separates the first oil chamber Y1 from the reservoir chamber R.

(Configuration and Function of the Solenoid Valve 50)

Figure 3:
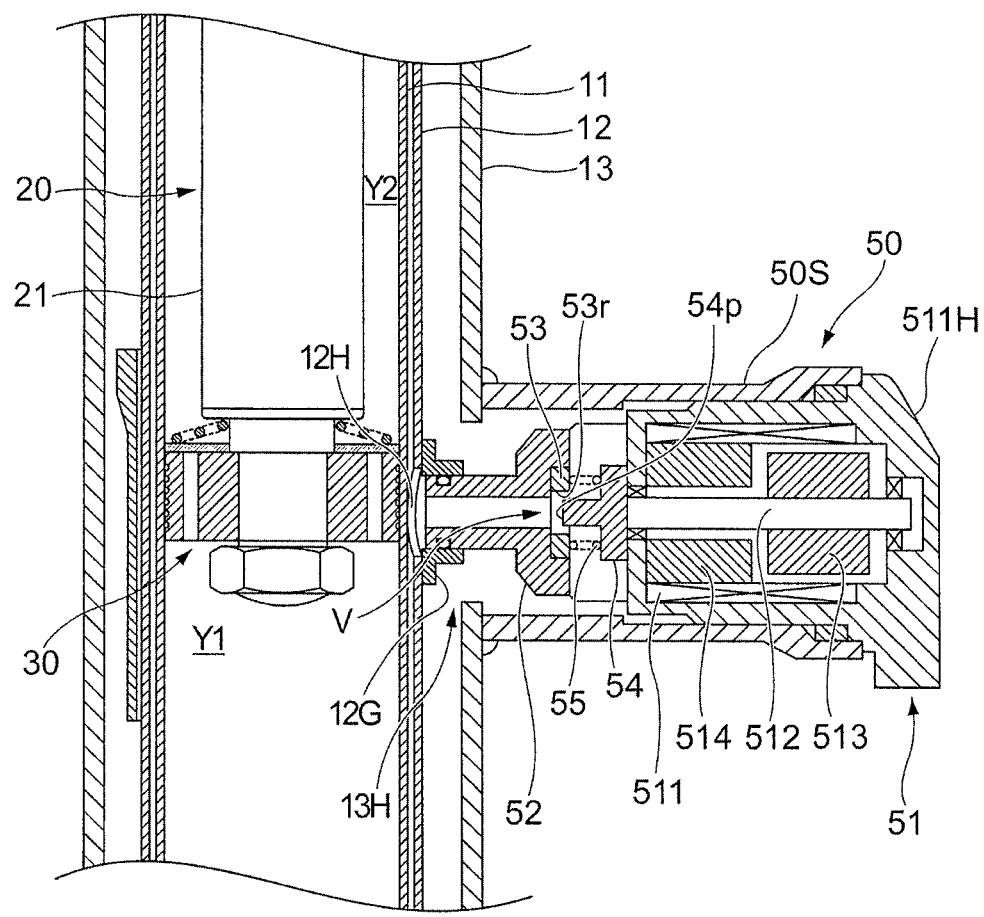
FIG. 3 is a diagram illustrating the periphery of a solenoid valve in detail.

FIG. 3 is a diagram illustrating the periphery of the solenoid valve in the present embodiment.

The solenoid valve 50 is provided on a side of the damper case 13. The solenoid valve 50 includes the solenoid cylinder 50S, a solenoid mechanism portion 51, a suction port 52, a valve stopper 53, a valve disc 54, and a spring 55.

The solenoid cylinder 50S is a cylindrical member, and one opening of the solenoid cylinder 50S lies opposite to the case opening 13H of the damper case 13 in the axial direction. In the present embodiment, the solenoid cylinder 50S is provided on the side of the damper case 13 so as to be oriented in a direction intersecting the axial direction.

The solenoid mechanism portion 51 has a coil 511, a housing 511H, a plunger 512, a magnetic element 513, and a fixed core 514.

The coil 511 is provided along the axial direction of the plunger 512 and held by the housing 511H. A wire not depicted in the drawings is connected to the coil 511, which is energized via the wire to generate a magnetic field. The energization of the coil 511 is controlled by the control apparatus 150 (see FIG. 1). Furthermore, the suspension apparatus 120 actually includes the four suspension apparatuses, that is, the right front suspension apparatus 120FR, the left front suspension apparatus 120FL, the right rear suspension apparatus 120RR, and the left rear suspension apparatus 120RL as described in FIG. 1. Thus, for the solenoid valve 50, four solenoid valves are present, that is, a right front solenoid valve 50FR, a left front solenoid valve 50FL, a right rear solenoid valve 50RR, and a left rear solenoid valve 50RL. The control apparatus 150 separately energizes and performs current control on these coils 511. This control will be described later in detail.

The plunger 512 is supported by the housing 511H via a bearing so as to be movable in the axial direction of the plunger 512. The magnetic element 513 such as a magnet is fixedly attached to the plunger 512. The plunger 512 contacts the valve disc 54 on one end portion side the plunger 512.

The fixed core 514 is disposed between the valve disc 54 and the magnetic element 513 in the axial direction of the plunger 512. The fixed core 514 is configured to be excited upon receiving a magnetic field generated when the coil 511 is energized.

In the present embodiment, an annular channel 53$r$ in the valve stopper 53 and a tip portion 54$p$ of the valve disc 54 form a restricting portion V for the oil in the solenoid valve 50. That is, in the solenoid valve 50 of the present embodiment, the restricting portion V narrows a channel cross section for the oil to generate a damping force. Moreover, the plunger 512 in the solenoid mechanism portion 51 changes the distance from the valve disc 54 to the valve stopper 53 to change the channel cross-sectional area for the flow of the oil, adjusting the damping force.

That is, an increased distance from the valve disc 54 to the valve stopper 53 increases the channel cross-sectional area. In this case, the damping force can be reduced. Furthermore, a reduced distance from the valve disc 54 to the valve stopper 53 reduces the channel cross-sectional area. In this case, the damping force can be increased.

[Operations of the Hydraulic Shock Absorber 1]

Operations of the hydraulic shock absorber 1 configured as described above will be described.

First, an operation of the hydraulic shock absorber 1 during a compression stroke will be described.

As depicted in FIG. 2, when the piston 30 moves to the first end portion side in the axial direction (downward in FIG. 2) during the compression stroke, the movement of the piston 30 pushes the oil in the first oil chamber Y1 to elevate the pressure in the first oil chamber Y1.

In the bottom valve 40, the valve 42 is provided on the second side of the valve body 41. The pressure on the reservoir chamber R side is relatively low compared to the pressure in the first oil chamber Y1, and thus, the valve 42 keeps closing the oil path 46.

In the piston 30, the pressure in the first oil chamber Y1 becomes relatively high compared to the pressure in the second oil chamber Y2. At this time, the pressure acting on the oil path 31H opens the valve 32, which is configured to close the oil path 31H. Then, the oil flows from the first oil chamber Y1 to the second oil chamber Y2.

Moreover, an amount of the oil corresponding to the volume of the piston rod 20 flows out through the cylinder opening 11H and flows through the communication path L and is thus fed to the solenoid valve 50.

The solenoid valve 50 receives the supply of the oil via the suction port 52, connected to the communication path L. Then, the flow of the oil flowing through the suction port 52 is restricted by the restricting portion V formed between the valve disc 54 and the valve stopper 53. At this time, a damping force for the compression stroke in the solenoid valve 50 is obtained.

The oil having flown through the restricting portion V flows out to the reservoir chamber R.

Now, an operation of the hydraulic shock absorber 1 during an extension stroke will be described.

As depicted in FIG. 2, when the piston 30 moves to the second end portion side (upward in FIG. 2) in the axial direction, the pressure in the first oil chamber Y1 becomes negative. Thus, the oil in the reservoir chamber R passes through the oil path 46 in the bottom valve 40 to open the valve 42, which is configured to close the oil path 46. The oil then flows into the first oil chamber Y1.

Then, the oil in the second oil chamber Y2 with the pressure elevated by the movement of the piston 30 to the axial second end portion side flows through the cylinder opening 11H and then through the communication path L and is thus fed to the solenoid valve 50. The subsequent flow of the oil in the solenoid valve 50 is as described above. A damping force for the extension stroke in the solenoid valve 50 is obtained.

[Description of the Control Apparatus 150]

Now, the control apparatus 150 will be described in detail.

Figure 4:
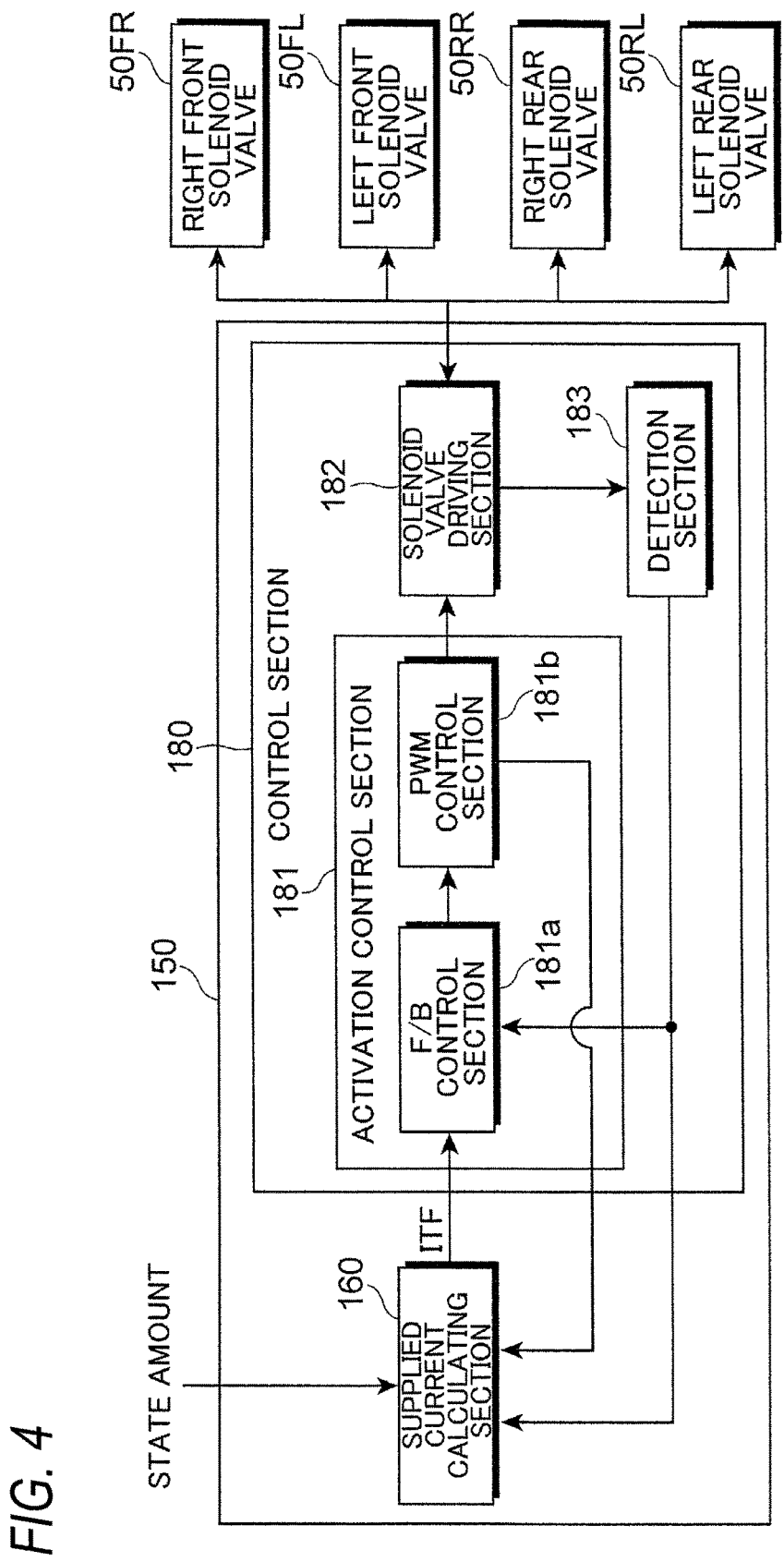
FIG. 4 is a block diagram of a control apparatus according to a first embodiment.

FIG. 4 is a block diagram of the control apparatus 150 according to the present embodiment.

The control apparatus 150 has a supplied current calculating section 160 that calculates currents ITF supplied to the right front solenoid valve 50FR, the left front solenoid valve 50FL, the right rear solenoid valve 50RR, and the left rear solenoid valve 50RL and a control section 180 that performs feedback control and the like based on the supplied currents ITF calculated by the supplied current calculating section 160.

The supplied current calculating section 160 calculates target currents ITA serving as targets for the currents supplied to the right front solenoid valve 50FR, the left front solenoid valve 50FL, the right rear solenoid valve 50RR, and the left rear solenoid valve 50RL based on a state amount indicative of the behavior of the vehicle 100. The state amount indicative of the behavior of the vehicle 100 may be, for example, an unspring speed, an unspring acceleration, a sprung speed, a sprung acceleration, the stroke speed of the hydraulic shock absorber, the stroke acceleration of the hydraulic shock absorber, or the stroke amount of the hydraulic shock absorber. The state amount indicative of the behavior of the vehicle may be calculated based on a variation in wheel speed or detected using an acceleration sensor or a stroke sensor.

The control section 180 has an activation control section 181 that controls activation of each of the solenoid valves including the right front solenoid valve 50FR, the left front solenoid valve 50FL, the right rear solenoid valve 50RR, and the left rear solenoid valve 50RL, a solenoid valve driving section 182 that drives each of the solenoid valves including the right front solenoid valve 50FR, the left front solenoid valve 50FL, the right rear solenoid valve 50RR, and the left rear solenoid valve 50RL, and a detection section 183 that detects an actual current IM actually flowing through each of the solenoid valves including the right front solenoid valve 50FR, the left front solenoid valve 50FL, the right rear solenoid valve 50RR, and the left rear solenoid valve 50RL, and the actual voltage VM of each of the solenoid valves.

The activation control section 181 has a feedback (F/B) control section 181a that performs feedback control based on the deviation between the supplied current ITF calculated by the supplied current calculating section 160 and the actual current IM detected by the detection section 183, and a PWM control section 181b that performs PWM control on each of the solenoid valves including the right front solenoid valve 50FR, the left front solenoid valve 50FL, the right rear solenoid valve 50RR, and the left rear solenoid valve 50RL.

The feedback control section 181a determines the deviation between the supplied current ITF and the actual current IM detected by the detection section 183 to execute a feedback process so as to zero the deviation. For a possible example, with respect to the deviation between the supplied current ITF and the actual current IM, the feedback control section 181a may use a proportional element to execute a proportion process, use an integral element to execute an integration process, and use an addition section to add the resultant values together. For an alternative possible example, with respect to the deviation between the supplied current ITF and the actual current IM, the feedback control section 181a may use the proportional element to execute the proportion process, use the integral element to execute the integration process, use a differential element to execute a differentiation process, and use the addition section to add the resultant values together.

The PWM control section 181b changes a duty ratio to perform PWM control on the opening degrees of the right front solenoid valve 50FR, the left front solenoid valve 50FL, the right rear solenoid valve 50RR, and the left rear solenoid valve 50RL (voltages applied to the coils 511 in the right front solenoid valve 50FR, the left front solenoid valve 50FL, the right rear solenoid valve 50RR, and the left rear solenoid valve 50RL). When the PWM control is performed, the voltages are applied to the coils 511 in the right front solenoid valve 50FR, the left front solenoid valve 50FL, the right rear solenoid valve 50RR, and the left rear solenoid valve 50RL in the form of pulses according to the duty ratio. Currents flowing through the coils 511 in the right front solenoid valve 50FR, the left front solenoid valve 50FL, the right rear solenoid valve 50RR, and the left rear solenoid valve 50RL increase or decrease in proportion to the duty ratio. The PWM control section 181b may, for example, set the duty ratio to zero when the supplied current ITF is zero and to 100% when the supplied current ITF is the maximum current described above.

The solenoid valve driving section 182 includes, for example, transistors connected between a positive pole side line from a power supply and each of the coils 511 including the right front solenoid valve 50FR, the left front solenoid valve 50FL, the right rear solenoid valve 50RR, and the left rear solenoid valve 50RL. The solenoid valve driving section 182 controls driving of each of the solenoid valves including the right front solenoid valve 50FR, the left front solenoid valve 50FL, the right rear solenoid valve 50RR, and the left rear solenoid valve 50RL by driving a gate of the corresponding transistor to allow the transistor to perform a switching operation.

The detection section 183 detects the value of the actual current IM flowing through each of the solenoid valves including the right front solenoid valve 50FR, the left front solenoid valve 50FL, the right rear solenoid valve 50RR, and the left rear solenoid valve 50RL, based on a voltage generated across a shunt resistor connected to the solenoid valve driving section 182. Furthermore, the detection section 183 detects the value of the actual voltage VM applied to each of the solenoid valves including the right front solenoid valve 50FR, the left front solenoid valve 50FL, the right rear solenoid valve 50RR, and the left rear solenoid valve 50RL by measuring a voltage applied to relays not depicted in the drawings and each of which switches on and off the corresponding one of the solenoid valves including the right front solenoid valve 50FR, the left front solenoid valve 50FL, the right rear solenoid valve 50RR, and the left rear solenoid valve 50RL.

[Description of the Supplied Current Calculating Section 160]

Now, the supplied current calculating section 160 will be described in detail.

Figure 5:
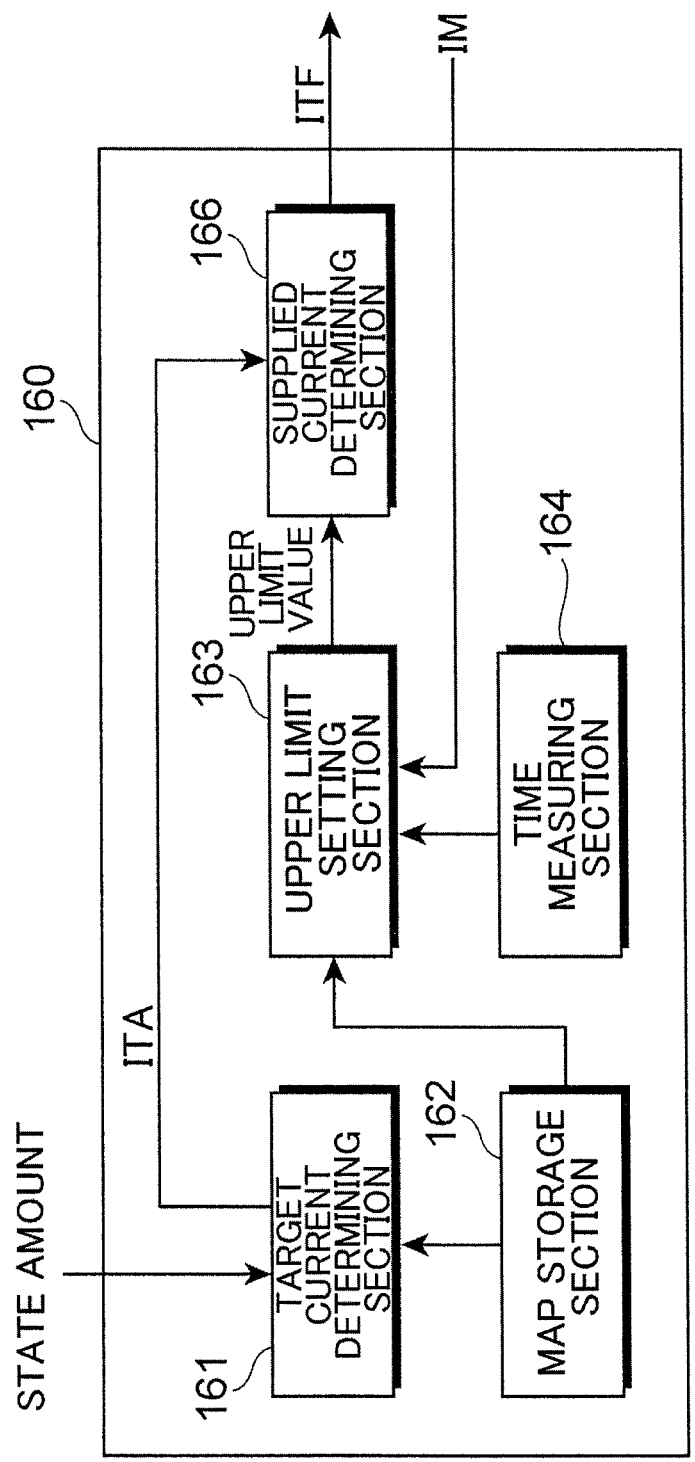
FIG. 5 is a block diagram of a supplied current calculating section according to the first embodiment.

FIG. 5 is a block diagram of the supplied current calculating section 160 of the present embodiment.

As depicted in FIG. 5, the supplied current calculating section 160 of the present embodiment includes a target current determining section 161, a map storage section 162, an upper limit setting section 163, a time measuring section 164, and a supplied current determining section 166.

The target current determining section 161, for example, determines the target current ITA supplied to the solenoid valve 50 based on a skyhook theory. According to the skyhook theory, the target current ITA is determined based on the sprung vertical speed of the suspension apparatus 120 and the stroke amount of the suspension apparatus 120.

The target current determining section 161 determines the target current ITA by, for example, substituting the sprung vertical speed and the stroke amount Sc into a map prepared based on a rule of thumb and depicting the correspondences between the sprung vertical speed and the stroke amount Sc and the target current ITA. The map is stored in the map storage section 162.

In the above-described example, the target current determining section 161 determines the target current ITA based on the sprung vertical speed and the stroke amount Sc using the skyhook theory. However, the present invention is not limited to this. For example, the vehicle speed may be detected at the time of acceleration and deceleration of the vehicle 100 so that the target current ITA is determined based on the vehicle speed. Alternatively, the target current ITA may be determined based on a steering angle or the skyhook theory, the vehicle speed, and the steering angle may be optionally used together. Alternatively, a switch that allows a user to set the damping force of the hydraulic shock absorber 1 may be provided so that the user determines the damping force of the hydraulic shock absorber 1 using the switch.

When the target current ITA continuously remains large for a long time, a large actual current IM is continuously supplied to the solenoid valve 50 for a long time. As a result, the coil 511 (see FIG. 3) is excessively heated and may be short-circuited.

Thus, the present embodiment inhibits this problem by providing the supplied current calculating section 160 with the map storage section 162, the upper limit setting section 163, the time measuring section 164, and the supplied current determining section 166 to perform correction to limit the target current ITA.

The upper limit setting section 163 sets an upper limit value for the current supplied to the solenoid valve 50. The upper limit setting section 163 then determines the upper limit value based on the already determined supplied current. As the already determined supplied current, besides the supplied current ITF previously determined by the supplied current determining section 166, the value of the actual current IM actually flowing through the solenoid valve 50 based on the previously determined supplied current ITF may be used. A case will be described below where the actual current IM is used as the already determined supplied current.

Specifically, the upper limit setting section 163 acquires the actual current IM from the detection section 183 at preset time intervals. The time intervals may be, for example, 100 ms (milliseconds). The timings when the actual current IM is acquired are determined based on the time measured by the time measuring section 164. The upper limit setting section 163 determines the moving average of the actual current IM acquired. The moving average is determined from values of the actual current IM acquired over a preset time. For example, the moving average may be the average of 50 values of the actual current IM acquired. In this case, the time needed to calculate the moving average is 100 ms×50=5 s (seconds).

Moreover, the upper limit setting section 163 determines a coefficient that increases or reduces the upper limit value from the calculated moving average of the actual current IM. The relation between the moving average of the actual current IM and the coefficient is, for example, stored in the map storage section 162 as a map. With reference to the map, the upper limit setting section 163 can determine the coefficient that increases or reduces the upper limit value from the moving average of the actual current IM.

Figure 6:
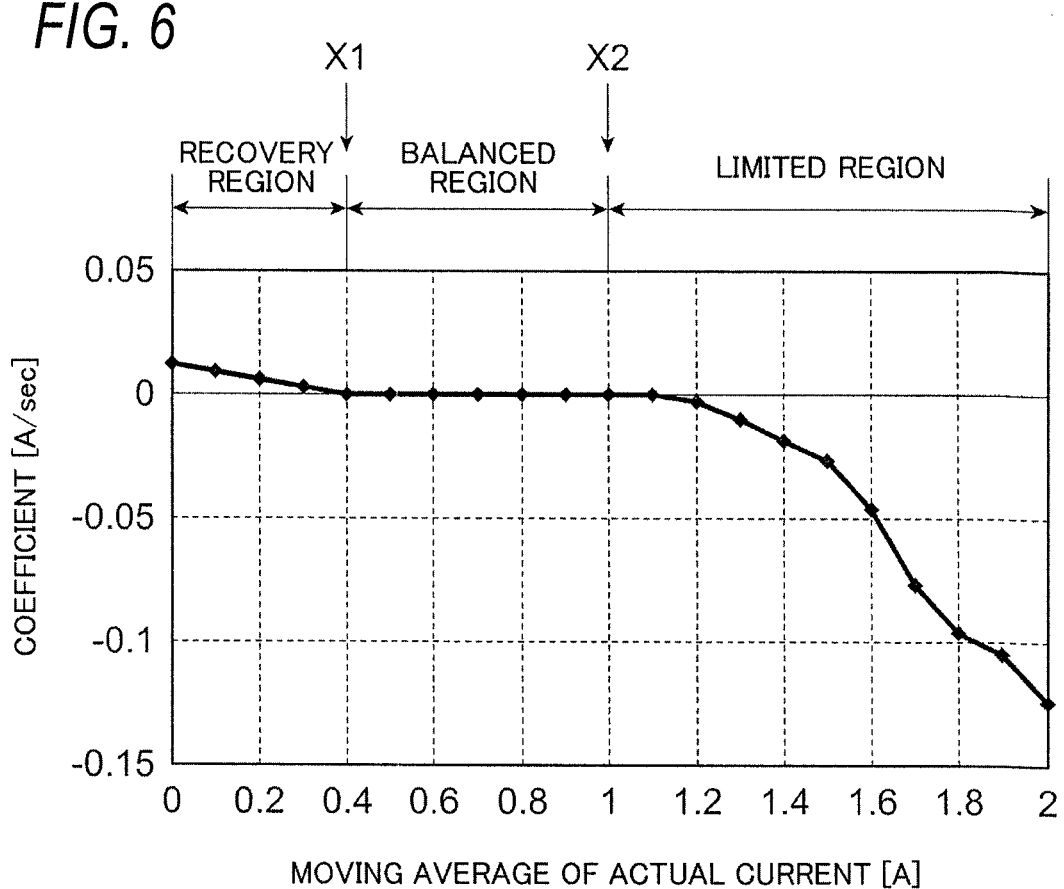
FIG. 6 is a diagram depicting the relation between the moving average of an actual current and a coefficient according to the first embodiment.

FIG. 6 is a diagram depicting the relation between the moving average of the actual current IM and the coefficient. In FIG. 6, the axis of abscissas represents the moving average of the actual current IM. The axis of ordinate represents the coefficient.

In FIG. 6, two thresholds, a first threshold X1 and a second threshold X2, are provided for the moving average of the actual current IM. In the present embodiment, the first threshold X1 is set to be a current value of 0.4 A. The second threshold X2 is set to be a current value of 1.0 A. A region where the moving average of the actual current IM is 0 A to X1 is referred to as a recovery region. A region where the moving average of the actual current IM is X1 to X2 is referred to as a balanced region. A region where the moving average of the actual current IM is X2 to 2 A is referred to as a limited region. The reason for the use of the value 2 A is that the upper limit of the actual current IM is 2 A according to the present embodiment.

As depicted in FIG. 6, the coefficient is set to decrease with increasing moving average of the actual current IM. The coefficient is set to be larger than 0 for the recovery region and to be smaller than 0 for the limited region. The coefficient is set to 0 for the balanced region between the recovery region and the limited region.

The coefficient is intended to determine the upper limit value of the supplied current ITF and indicates the degree to which the upper limit value is increased or reduced per second. For example, a coefficient of −0.05 A/s means that the upper limit value of the supplied current ITF decreases by 0.05 A per second.

In other words, for the return area with the small moving average of the actual current IM, the coefficient is increased above zero to gradually increase the upper limit value of the supplied current ITF. Furthermore, for the limited area with the large moving average of the actual current IM, the coefficient is reduced below zero to gradually reduce the upper limit value of the supplied current ITF. Moreover, for the balanced area between the return area and the limited area, the coefficient is set to zero to maintain the upper limit value of the supplied current ITF.

The newly set upper limit value can be calculated from the last calculated upper limit value, using the coefficient. This can be expressed as follows:

(New upper limit value)=(last calculated upper limit value)+(coefficient)×(time intervals).

In the expression, the time intervals may be the time intervals or control periods when the upper limit value is set. For a possible example, the time intervals when the upper limit value is set may be 5 s, which is the time needed to calculate the moving average.

The supplied current determining section 166 determines the supplied current ITF supplied to the solenoid valve 50 from the target current ITA and the upper limit value set by the upper limit setting section 163.

The supplied current determining section 166 compares the target current ITA with the upper limit value set by the upper limit setting section 163. When the target current ITA is equal to or smaller than the upper limit value, the supplied current determining section 166 outputs the target current ITA as the supplied current ITF.

In contrast, when the target current ITA exceeds the upper limit value, the supplied current ITF limited to the upper limit value is output.

The supplied current ITF is determined for each of the right front solenoid valve 50FR, the left front solenoid valve 50FL, the right rear solenoid valve 50RR, and the left rear solenoid valve 50RL. However, the supplied current determining section 166 may select the smallest one of these supplied currents ITF for output (minimum select). This allows the same supplied current ITF to be determined for each of the right front solenoid valve 50FR, the left front solenoid valve 50FL, the right rear solenoid valve 50RR, and the left rear solenoid valve 50RL. This is effective for further stabilizing the behavior of the vehicle 100.

[Description of Operations of the Supplied Current Calculating Section 160]

Now, operations of the supplied current calculating section 160 will be described.

Figure 7:
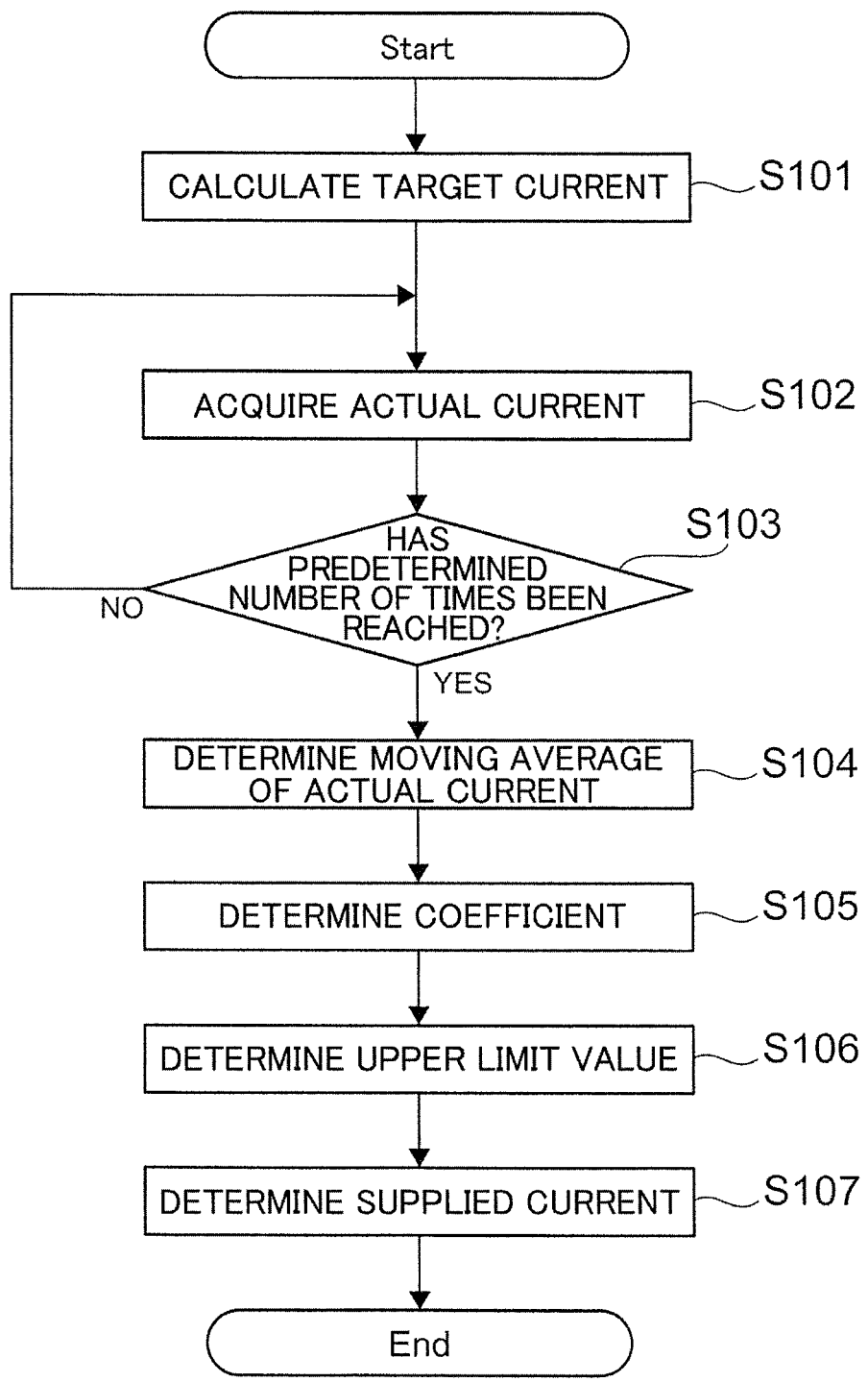
FIG. 7 is a flowchart illustrating operations of the supplied current calculating section according to the first embodiment.

FIG. 7 is a flowchart illustrating the operations of the supplied current calculating section 160. The supplied current calculating section 160 repeatedly performs the operations at preset time intervals.

First, the target current determining section 161 references the map stored in the map storage section 162 to calculate the target current ITA from a vehicle speed Vc (step 101).

Then, the upper limit setting section 163 acquires the actual current IM from the detection section 183 at preset time intervals (100 ms in the above-described example) (step 102).

The upper limit setting section 163 determines whether or not the number of values of the actual current IM acquired has reached a predetermined value (50 in the above-described example) (step 103).

When the number of values of the actual current IM acquired is smaller than the predetermined value (step 103, No), the process returns to step 102.

On the other hand, when the number of values of the actual current IM acquired has reached the predetermined value (step 103, Yes), the upper limit setting section 163 calculates the moving average of the actual current IM (step 104).

The moving average may be calculated without providing step 103 or waiting for the predetermined value to be reached. In this case, the current moving average may be calculated until the predetermined value is reached.

The upper limit setting section 163 references the map stored in the map storage section 162 and the contents of which are as depicted in FIG. 6, to determine the coefficient from the moving average of the actual current IM (step 105).

The upper limit setting section 163 then applies the coefficient to the last determined upper limit value to determine a new upper limit value (step 106). At this time, the upper limit setting section 163 increases the upper limit value when the moving average of the actual current IM is smaller than the first threshold X1, and reduces the upper limit value when the moving average of the actual current IM is larger than the second threshold X2, which is set equal to or larger than the first threshold X1. Furthermore, the upper limit setting section 163 maintains the upper limit value when the moving average of the actual current IM is equal to or larger than the first threshold X1 and equal to or smaller than the second threshold X2.

Then, the supplied current determining section 166 compares the target current ITA calculated by the target current determining section 161 with the upper limit value set by the upper limit setting section 163 to determine the supplied current ITF (step 107).

At this time, the supplied current determining section 166 may perform the minimum select. The supplied current determining section 166 also determines whether the supplied current ITF exceeds the upper limit (2 A in the above-described example) of the actual current IM. When the supplied current ITF exceeds the upper limit, the supplied current determining section 166 may execute a process of limiting the supplied current ITF to the upper limit.

The supplied current calculating section 160 described above gradually reduces the upper limit value of the supplied current ITF when the moving average of the actual current IM continuously remains in the limited region. As a result, the supplied current ITF is limited and gradually decreases. Then, the moving average of the actual current IM settles at the vicinity of the second threshold X2 described above. This suppresses heat generation in the coil 511, making the coil 511 unlikely to be short-circuited. That is, even when the target current ITA continuously remains large, the actual current IM actually supplied to the coil 511 is limited to allow suppression of heat generation in the coil 511.

Furthermore, when the moving average of the actual current IM continuously remains in the recovery region, the upper limit value of the supplied current ITF gradually increases. Thus, even when the supplied current ITF is limited, the supplied current ITF gradually increases to approach the target current ITA.

The above-described supplied current calculating section 160 directly determines the upper limit value without executing processing such as estimation of the temperature of the coil 511 based on the moving average of the actual current IM. Thus, the supplied current calculating section 160 can more easily and quickly calculate the supplied current.

The above-described suspension apparatus 120 and control apparatus 150 may be understood as a damping force varying damper system.

In the above-described example, the balanced region is provided but need not be provided. In this case, the first threshold X1 and second threshold X2 described with reference to FIG. 6 have the same value.

Furthermore, in the above-described example, the upper limit setting section 163 sets the upper limit value based on the moving average of the actual current IM. However, the present invention is not limited to this. The upper limit value may be set based on an integral value of actual current IM. In other words, the upper limit setting section 163 sets the upper limit value based on integral values of the actual current acquired at preset time intervals (for example, every 100 ms) over a preset time (for example, 5 s).

In the above-described example, the upper limit setting section 163 sets the upper limit value based on the actual current IM. However, the present invention is not limited to this. The upper limit value may be set based on the supplied current ITF already determined by the supplied current determining section 166. In this case, the upper limit setting section 163 sets the upper limit value using the moving average or integral value of the supplied current ITF over a preset time (for example, 50 s) already determined by the supplied current determining section 166.

Furthermore, in the above-described example, the case where a current is supplied to the solenoid valve 50 has been described. However, the upper limit setting section 163 may continue to set the upper limit value even when no current is supplied to the solenoid valve 50, for example, after an ignition of the vehicle 100 is switched off. In this case, if the upper limit value obtained when the ignition is switched off is equal to or smaller than a preset value, the upper limit setting section 163 may continue to set the upper limit value.

Furthermore, after the upper limit value recovers to the maximum value, the upper limit setting section 163 may end setting the upper limit value.

Moreover, in the above-described example, the case has been described where the vehicle 100 is a four-wheeled vehicle with four wheels. However, the number of wheels is not limited to four, but the vehicle may have any number of wheels. For example, the present embodiment is of course applicable to a three-wheeled vehicle with three wheels or a bicycle with two wheels.

[Second Embodiment]

Now, a second embodiment will be described in detail focusing on differences from the first embodiment.

Figure 8:
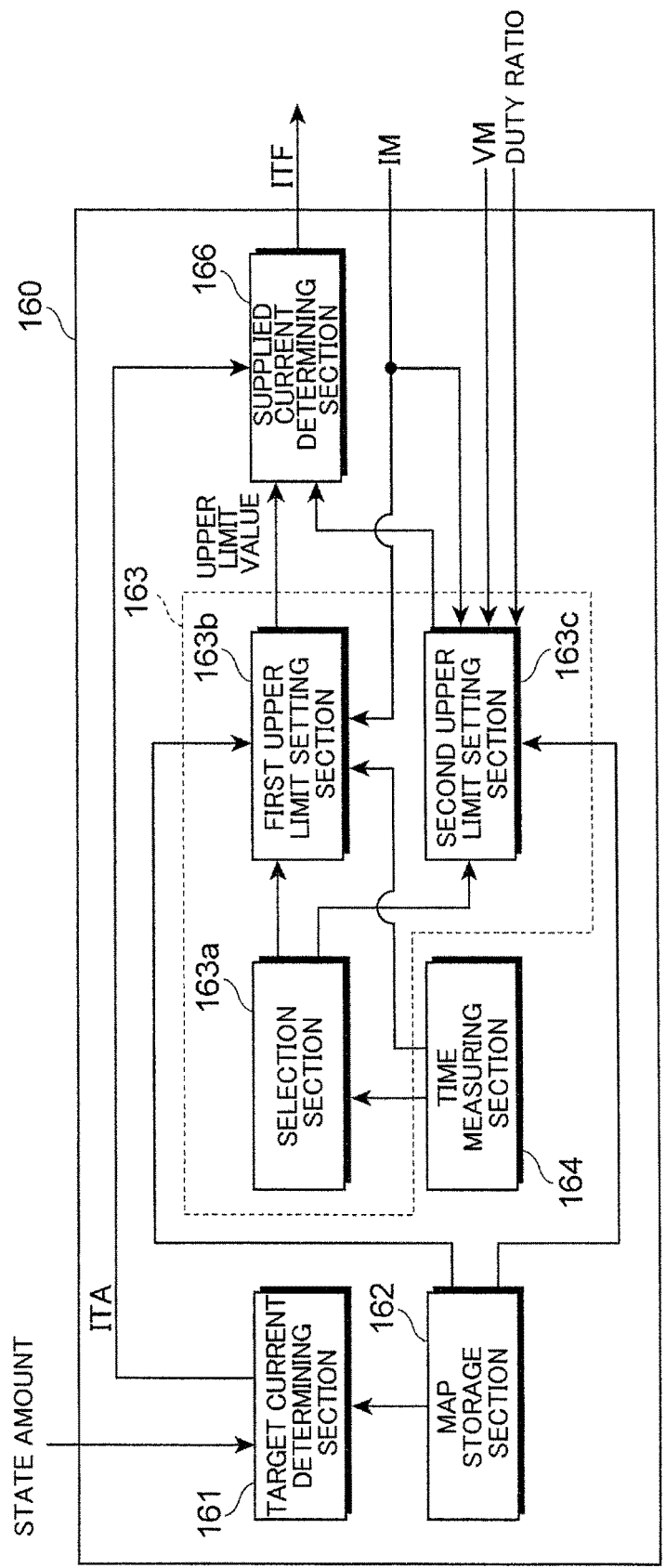
FIG. 8 is a block diagram of a supplied current calculating section according to a second embodiment.

FIG. 8 is a block diagram of a supplied current calculating section 160 in the present embodiment.

As depicted in FIG. 8, the supplied current calculating section 160 of the present embodiment includes a target current determining section 161, a map storage section 162, an upper limit setting section 163, a time measuring section 164, and a supplied current determining section 166. In this regard, the supplied current calculating section 160 of the present embodiment is similar to the supplied current calculating section 160 in FIG. 5.

The sections other than the upper limit setting section 163 are similar to the corresponding sections in FIG. 5. Hence, the following description focuses on the contents of the upper limit setting section 163.

The upper limit setting section 163 sets the upper limit value of a current supplied to a solenoid valve 50.

In the present embodiment, the upper limit setting section 163 is different from the upper limit setting section 163 in FIG. 5 in that the former includes a selection section 163a, a first upper limit setting section 163b, and a second upper limit setting section 163c.

The first upper limit setting section 163b performs operations similar to the operations of the upper limit setting section 163 in FIG. 5. In other words, the first upper limit setting section 163b determines an upper limit value based on an already determined supplied current for the solenoid valve 50. Specifically, the first upper limit setting section 163b determines a coefficient that increases or reduces the upper limit value from a calculated moving average of an actual current IM. The relation between the moving average of the actual current IM and the coefficient is, for example, stored in the map storage section 162 as a map. With reference to the map, the first upper limit setting section 163b can determine the coefficient that increases or reduces the upper limit value from the moving average of the actual current IM. The relation between the moving average of the actual current IM and the coefficient is similar to the corresponding relation illustrated in FIG. 6.

Furthermore, the second upper limit setting section 163c determines the upper limit value from a resistance value determined based on the actual current IM and an actual voltage VM supplied to the solenoid valve 50.

Specifically, the second upper limit setting section 163c acquires the actual current IM and the actual voltage VM from a detection section 183. The second upper limit setting section 163c further acquires a duty ratio from a PWM control section 181b. The second upper limit setting section 163c then estimates an inter-coil voltage that is a voltage applied to a coil 511, from the actual voltage VM and the duty ratio in accordance with Expression (1).

$$\text{Inter-coil voltage} = \text{actual voltage } VM \times \text{duty ratio} + \text{corrective offset value} \quad (1)$$

The second upper limit setting section 163c then calculates an inter-coil resistance that is the resistance of the coil 511, in accordance with Expression (2) that is an Ohm's law.

$$\text{Inter-coil resistance} = \text{inter-coil voltage/actual current } IM \quad (2)$$

Moreover, the second upper limit setting section 163c determines the upper limit value based on the inter-coil resistance. The relation between the inter-coil resistance and the upper limit value is stored in the map storage section 162 as a map. With reference to the map, the second upper limit setting section 163c can determine the upper limit value from the inter-coil resistance.

Figure 9:
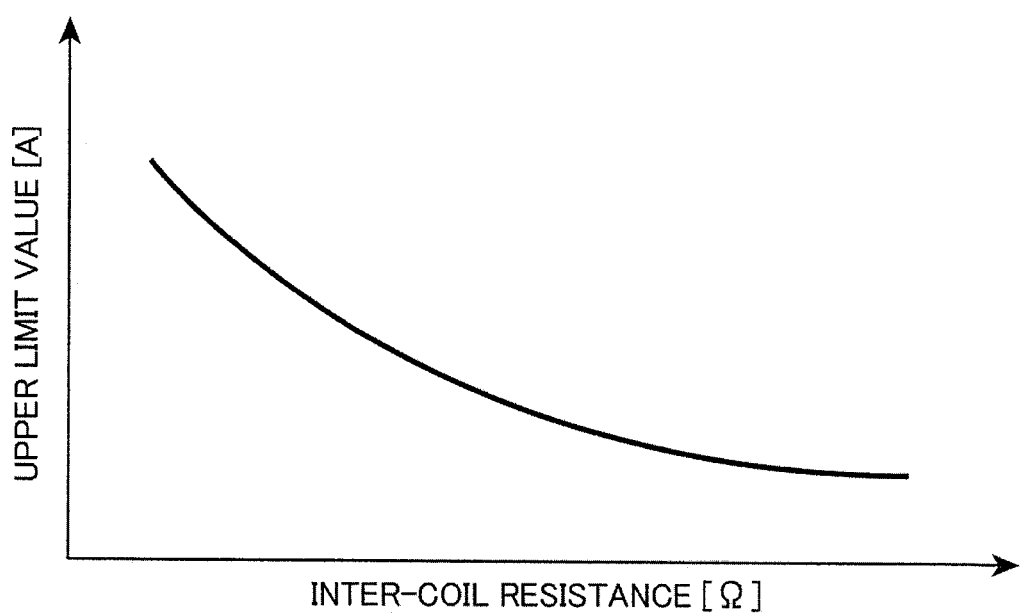
FIG. 9 is a diagram depicting the relation between intercoil resistance and an upper limit value according to the second embodiment.

FIG. 9 depicts the relation between the inter-coil resistance and the upper limit value. In FIG. 9, the axis of abscissas represents the inter-coil resistance, and the axis of ordinate represents the upper limit value.

As depicted in FIG. 9, in the present embodiment, the set upper limit value decreases with increasing inter-coil resistance. In other words, a large inter-coil resistance means a high temperature of the coil 511. Furthermore, a small inter-coil resistance means a low temperature of the coil 511. If the actual current IM is increased when the coil 511 has a high temperature, the coil 511 is likely to be short-circuited. On the other hand, if the actual current IM is increased when the coil 511 has a low temperature, the coil 511 is unlikely to be short-circuited. Thus, when the inter-coil resistance is large and the coil 511 has a high temperature, a small upper limit value needs to be set. In contrast, when the inter-coil resistance is small and the coil 511 has a low temperature, an increased upper limit value may be set. Consequently, in the present embodiment, the upper limit value is set to decrease with increasing inter-coil resistance.

The selection section 163a selectively determines which of the first and second upper limit setting sections 163b and 163c is used to determine the upper limit value.

The second upper limit setting section 163c needs information on the actual current IM, the actual voltage VM, and the duty ratio in order to determine the upper limit value. In this case, while the vehicle 100 is traveling, a current variation may occur depending on the condition of a road surface, and thus, the upper limit value is likely to be affected by this variation.

On the other hand, the first upper limit setting section 163b uses the moving average of the actual current IM to determine the upper limit value and is thus unlikely to be affected by the current variation that may occur depending on the condition of the road surface.

However, for the first upper limit setting section 163b, once a control apparatus 150 is powered off, the already calculated moving average of the actual current IM is erased. Then, when the control apparatus 150 is powered on again, a large upper limit value is set even if the coil 511 has a high temperature. In contrast, this does not apply to the second upper limit setting section 163c.

Thus, in the present embodiment, the selection section 163a is provided to select the first upper limit setting section 163b or the second upper limit setting section 163c to determine the upper limit value.

Specifically, the selection section 163a selects the second upper limit setting section 163c to set the upper limit value until a preset duration elapses. Then, after the preset duration elapses, the selection section 163a selects the first upper limit setting section 163b to set the upper limit value. The preset duration is measured by the time measuring section 164.

The preset duration may be set to be a duration elapsed from power-on of the control apparatus 150 (first duration). In this case, the selection section 163a selects the second upper limit setting section 163c until the first duration has elapsed from the power-on of the control apparatus 150, and selects the first upper limit setting section 163b after the first duration elapses. The first duration may be, for example, 200 ms.

Furthermore, the preset duration may be set to be a duration from the start of current supply to the solenoid valve 50 (second duration). In this case, the selection section 163a selects the second upper limit setting section 163c until the second duration has elapsed from the start of current supply to the solenoid valve 50, and selects the first upper limit setting section 163b after the second duration elapses.

Moreover, the preset duration may be set to be a period when the actual current IM to the solenoid valve 50 is zero.

In other words, the selection section 163a selects the second upper limit setting section 163c before the vehicle 100 starts to travel or while the vehicle 100 is still traveling at low speed. Then, the second upper limit setting section 163c determines the upper limit value. Thus, even when the coil 511 fails to be sufficiently cooled while the vehicle 100 is stopped and remains at a high temperature, this can be detected so that the upper limit value can be reduced. Furthermore, in this case, since the vehicle 100 has not started traveling or is traveling at low speed, the current variation that may occur depending on the condition of the road surface does not pose a significant problem.

After the preset duration elapses, the selection section 163a switches from the second upper limit setting section 163c to the first upper limit setting section 163b. Then, the first upper limit setting section 163b determines the upper limit value. Since the appropriate upper limit value has already been selected by the second upper limit setting section 163c, even when the selection is switched to the first upper limit setting section 163b, a process can be executed in which this upper limit value is increased or reducing using a coefficient. Hence, the upper limit value is prevented from being set to an excessively large value. Subsequently, the first upper limit setting section 163b, which is unlikely to be affected by the current variation depending on the condition of the road surface, can determine the upper limit value.

In the second upper limit setting section 163c, the actual current IM and the actual voltage VM are acquired from the detection section 183 as described above. In this regard, the detection section 183 preferably avoids simultaneously detecting the actual current IM or the actual voltage VM for each of the right front solenoid valve 50FR, the left front solenoid valve 50FL, the right rear solenoid valve 50RR, and the left rear solenoid valve 50RL. This suppresses a voltage drop to improve the accuracy of the actual current IM and actual voltage VM acquired.

[Description of Operations of the Second Embodiment of the Supplied Current Calculating Section 160]

Now, operations of the supplied current calculating section 160 will be described.

Figure 10:
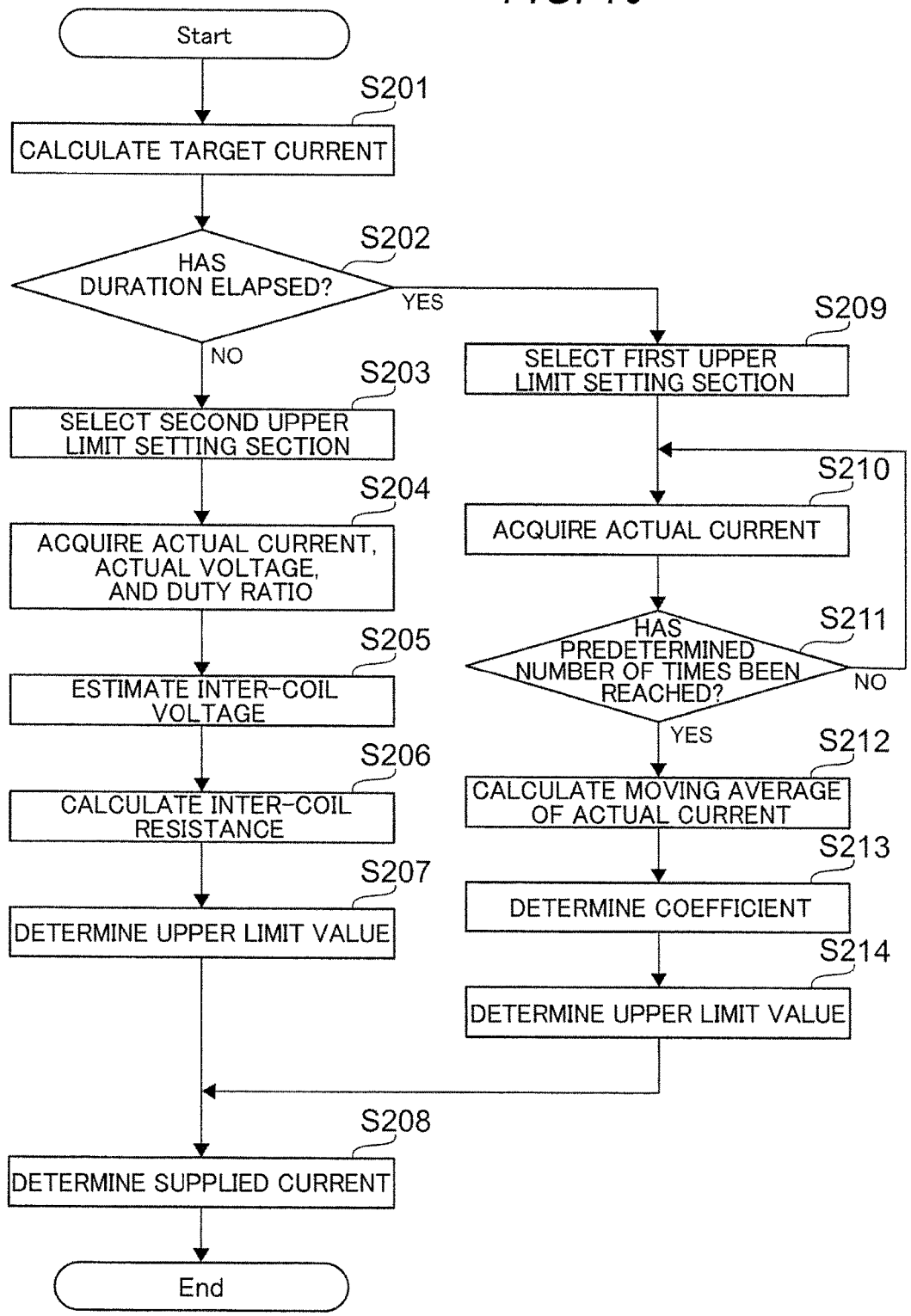
FIG. 10 is a flowchart illustrating operations of the supplied current calculating section according to the second embodiment.

FIG. 10 is a flowchart illustrating the operations of the supplied current calculating section 160. The supplied current calculating section 160 repeatedly performs the operations at preset time intervals.

First, the target current determining section 161 references the map stored in the map storage section 162 to calculate a target current ITA from a vehicle speed Vc (step 201).

Then, the selection section 163a selects the first upper limit setting section 163b or the second upper limit setting section 163c to determine the upper limit value. This is achieved by, for example, determining whether or not the preset duration has elapsed from the power-on of the control apparatus 150 as described above (step 202).

When the preset duration has not elapsed (step 202, No), the selection section 163a selects the second upper limit setting section 163c (step 203).

Then, the second upper limit setting section 163c acquires the actual current IM and the actual voltage VM from the detection section 183 and also acquires a duty ratio from a PWM control section 181b (step 204).

Furthermore, the second upper limit setting section 163c estimates an inter-coil voltage that is a voltage applied to the coil 511, from the actual voltage VM and the duty ratio in accordance with Expression (1) described above (step 205).

Moreover, the second upper limit setting section 163c calculates an inter-coil resistance that is the resistance of the coil 511, in accordance with Expression (2) described above (step 206).

The second upper limit setting section 163c references the map stored in the map storage section 162 to determine the upper limit value from the inter-coil resistance (step 207).

Then, the supplied current determining section 166 compares the target current ITA calculated by the target current determining section 161 with the upper limit value set by the upper limit setting section 163 to determine a supplied current ITF (step 208).

On the other hand, when the preset duration has elapsed (step 202, Yes), the selection section 163a selects the first upper limit setting section 163b (step 209).

The first upper limit setting section 163b then acquires the actual current IM from the detection section 183 at preset time intervals (100 ms in the above-described example) (step 210).

The first upper limit setting section 163b then determines whether or not the number of values of the actual current IM acquired has reached a predetermined value (50 in the above-described example) (step 211).

When the number of values of the actual current IM acquired is smaller than the predetermined value (step 211, No), the process returns to step 209.

On the other hand, when the number of values of the actual current IM acquired has reached the predetermined value (step 211, Yes), the first upper limit setting section 163b calculates the moving average of the actual current IM (step 212).

The first upper limit setting section 163b references the map stored in the map storage section 162 and the contents of which are as depicted in FIG. 6, to determine the coefficient from the moving average of the actual current IM (step 213).

The first upper limit setting section 163b then applies the coefficient to the last determined upper limit value to determine a new upper limit value (step 214). At this time, the first upper limit setting section 163b increases the upper limit value when the moving average of the actual current IM is smaller than a first threshold X1, and reduces the upper limit value when the moving average of the actual current IM is larger than a second threshold X2 set equal to or larger than the first threshold X1. Furthermore, the first upper limit setting section 163b maintains the upper limit value when the moving average of the actual current IM is equal to or larger than the first threshold X1 and equal to or smaller than the second threshold X2.

Then, the supplied current determining section 166 compares the target current ITA calculated by the target current determining section 161 with the upper limit value set by the upper limit setting section 163 to determine the supplied current ITF (step 208).

At this time, the supplied current determining section 166 may perform the minimum select. The supplied current determining section 166 also determines whether the supplied current ITF exceeds the upper limit (2 A in the above-described example) of the actual current IM. When the supplied current ITF exceeds the upper limit, the supplied current determining section 166 may execute a process of limiting the supplied current ITF to the upper limit.

In the above-described supplied current calculating section 160, in an initial stage when the control apparatus 150 starts operating, the appropriate upper limit value can be set by using the second upper limit setting section 163c. Subsequently, the upper limit value is set using the first upper limit setting section 163b. In this case, when the moving average of the actual current IM continuously remains in a limited region, the upper limit value of the supplied current ITF gradually decreases. As a result, the supplied current ITF is limited and gradually decreases. Then, the moving average of the actual current IM settles at the vicinity of the second threshold X2 described above. This suppresses heat generation in the coil 511, making the coil 511 unlikely to be short-circuited. That is, even when the target current ITA continuously remains large, the actual current IM actually supplied to the coil 511 is limited to allow suppression of heat generation in the coil 511.

[Third Embodiment]

Now, a third embodiment will be described in detail focusing on differences from the first embodiment.

Figure 11:
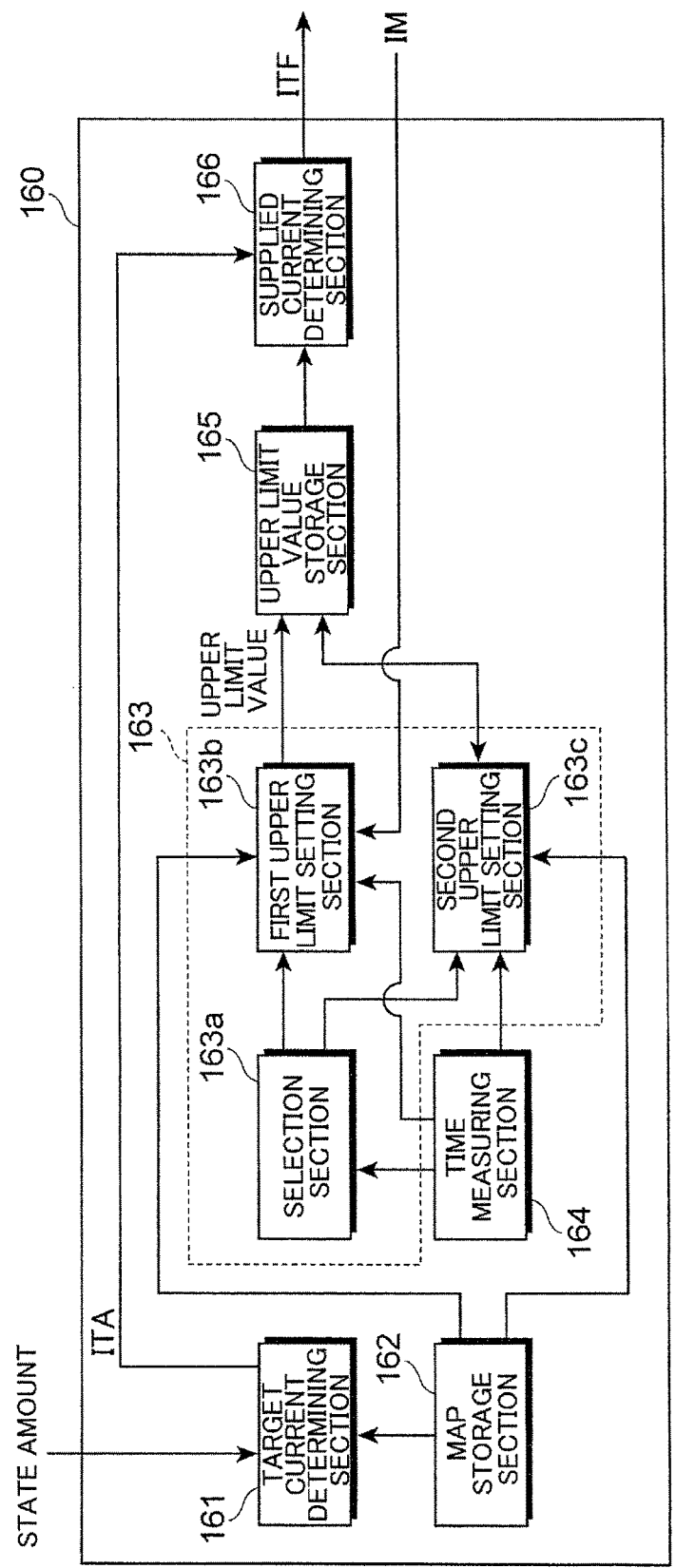
FIG. 11 is a block diagram of a supplied current calculating section according to a third embodiment.

FIG. 11 is a block diagram of a supplied current calculating section 160 in the present embodiment.

As depicted in FIG. 11, the supplied current calculating section 160 of the present embodiment includes a target current determining section 161, a map storage section 162, an upper limit setting section 163, a time measuring section 164, an upper limit value storage section 165, and a supplied current determining section 166.

The sections other than the upper limit setting section 163 and the upper limit value storage section 165 are similar to the corresponding sections in FIG. 5. Hence, the following description focuses on the contents of the upper limit setting section 163 and the upper limit value storage section 165.

The upper limit setting section 163 sets an upper limit value for a current supplied to a solenoid valve 50.

In the present embodiment, the upper limit setting section 163 is different from the upper limit setting section 163 in FIG. 5 in that the former includes a selection section 163a, a first upper limit setting section 163b, and a second upper limit setting section 163c.

The first upper limit setting section 163b performs operations similar to the operations of the upper limit setting section 163 in FIG. 5. In other words, the first upper limit setting section 163b determines then upper limit value based on an already determined supplied current for the solenoid valve 50. Specifically, the first upper limit setting section 163b determines a coefficient that increases or reduces the upper limit value from a calculated moving average of the actual current IM. The relation between the moving average of the actual current IM and the coefficient is, for example, stored in the map storage section 162 as a map. With reference to the map, the first upper limit setting section 163b can determine the coefficient that increases or reduces the upper limit value from the moving average of the actual current IM. The relation between the moving average of the actual current IM and the coefficient is similar to the corresponding relation illustrated in FIG. 6.

Furthermore, the second upper limit setting section 163c determines the upper limit value from an elapsed time from power-off of a control apparatus 150 and the upper limit value stored in the upper limit value storage section 165 at the time of the last power-off of the control apparatus 150.

The elapsed time from the last power-off of the control apparatus 150 is measured by the time measuring section 164. Furthermore, the upper limit value storage section 165 stores the last one of the upper limit values determined by the upper limit setting section 163. At this time, since the upper limit value storage section 165 stores the last determined upper limit value, the upper limit value stored in the upper limit value storage section 165 is an upper limit value obtained at the time of the last power-off of the control apparatus 150.

The coil 511 is more significantly cooled to a lower temperature as the elapsed time from the power-off of the control apparatus 150 becomes longer. Hence, determination of the upper limit value obtained at the time of the last power-off of the control apparatus 150 and the elapsed time from the power-off allows determination of the degree to which the coil 511 has been cooled. This allows determination of the upper limit value obtained when the control apparatus 150 is powered on again.

The upper limit value obtained at the time of the last power-off of the control apparatus 150 and the relation of the upper limit value with the duration are stored in the map storage section 162 as a map. With reference to the map, the second upper limit setting section 163c can determine the upper limit value.

Figure 12:
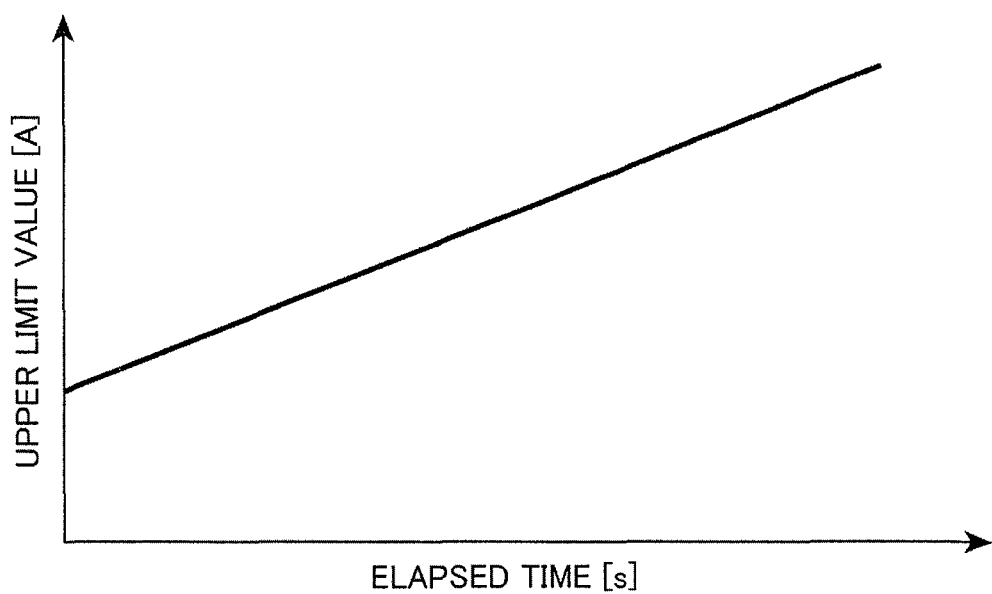
FIG. 12 is a diagram depicting the relation between elapsed time and the upper limit value according to the third embodiment.

FIG. 12 is a diagram depicting the relation between the elapsed time and the upper limit value. In FIG. 12, the axis of abscissas represents the elapsed time, and the axis of ordinate represents the upper limit value.

As depicted in FIG. 12, in the present embodiment, the upper limit value is set to increase in proportion to elapsed time. In other words, when the elapsed time is short, the coil 511 has not been significantly cooled and has a higher temperature. Furthermore, when the elapsed time is long, the coil 511 has been more significantly cooled and has a lower temperature. If the actual current IM is increased when the coil 511 has a high temperature, the coil 511 is likely to be short-circuited. On the other hand, if the actual current IM is increased when the coil 511 has a low temperature, the coil 511 is unlikely to be short-circuited. Thus, when the elapsed time is short and the coil 511 has a high temperature, a small upper limit value needs to be set. In contrast, when the elapsed time is short and the coil 511 has a low temperature, an increased upper limit value may be set. Consequently, in the present embodiment, the upper limit value is set to increase in proportion to elapsed time.

The selection section 163a selectively determines which of the first and second upper limit setting sections 163b and 163c is used to determine the upper limit value.

The first upper limit setting section 163b uses the moving average of the actual current IM to determine the upper limit value. Thus, once the control apparatus 150 is powered off, the already calculated moving average of the actual current IM is erased. Then, when the control apparatus 150 is powered on again, a large upper limit value is set even if the coil 511 has a high temperature. In contrast, this does not apply to the second upper limit setting section 163c.

Thus, in the present embodiment, the selection section 163a is provided to select the first upper limit setting section 163b or the second upper limit setting section 163c to determine the upper limit value.

Specifically, the selection section 163a selects the second upper limit setting section 163c to set the upper limit value until a preset duration elapses. Then, after the preset duration elapses, the selection section 163a selects the first upper limit setting section 163b to set the upper limit value. The preset duration is measured by the time measuring section 164.

The preset duration may be set to be a duration elapsed from power-on of the control apparatus 150 (first duration). In this case, the selection section 163a selects the second upper limit setting section 163 until the first duration has elapsed from the power-on of the control apparatus 150, and selects the first upper limit setting section 163b after the first duration elapses. The first duration may be, for example, 200 ms.

Furthermore, the preset duration may be set to be a duration from the start of current supply to the solenoid valve 50 (second duration). In this case, the selection section 163a selects the second upper limit setting section 163 until the second duration has elapsed from the start of current supply to the solenoid valve 50, and selects the first upper limit setting section 163b after the second duration elapses.

Moreover, the preset duration may be set to be a period when the actual current IM to the solenoid valve 50 is zero.

In other words, the selection section 163a selects the second upper limit setting section 163c before the vehicle 100 starts to travel or while the vehicle is still traveling at low speed. Then, the second upper limit setting section 163c determines the upper limit value. Thus, even when the coil 511 fails to be sufficiently cooled while the vehicle 100 is stopped and remains hot, this can be detected so that the upper limit value can be reduced. Furthermore, in this case, since the vehicle 100 has not started traveling or is traveling at low speed, a current variation that may occur depending on the condition of the road surface does not pose a significant problem.

After the preset duration elapses, the selection section 163a switches from the second upper limit setting section 163c to the first upper limit setting section 163b. Then, the first upper limit setting section 163b determines the upper limit value. Since the appropriate upper limit value has already been selected by the second upper limit setting section 163c, even when the selection is switched to the first upper limit setting section 163b, a process can be executed in which this upper limit value is increased or reducing using a coefficient. Hence, the upper limit value is prevented from being set to an excessively large value. Subsequently, the first upper limit setting section 163b, which is unlikely to be affected by the current variation depending on the condition of the road surface, can determine the upper limit value.

[Description of Operations of the Third Embodiment of the Supplied Current Calculating Section 160]

Now, operations of the supplied current calculating section 160 will be described.

Figure 13:
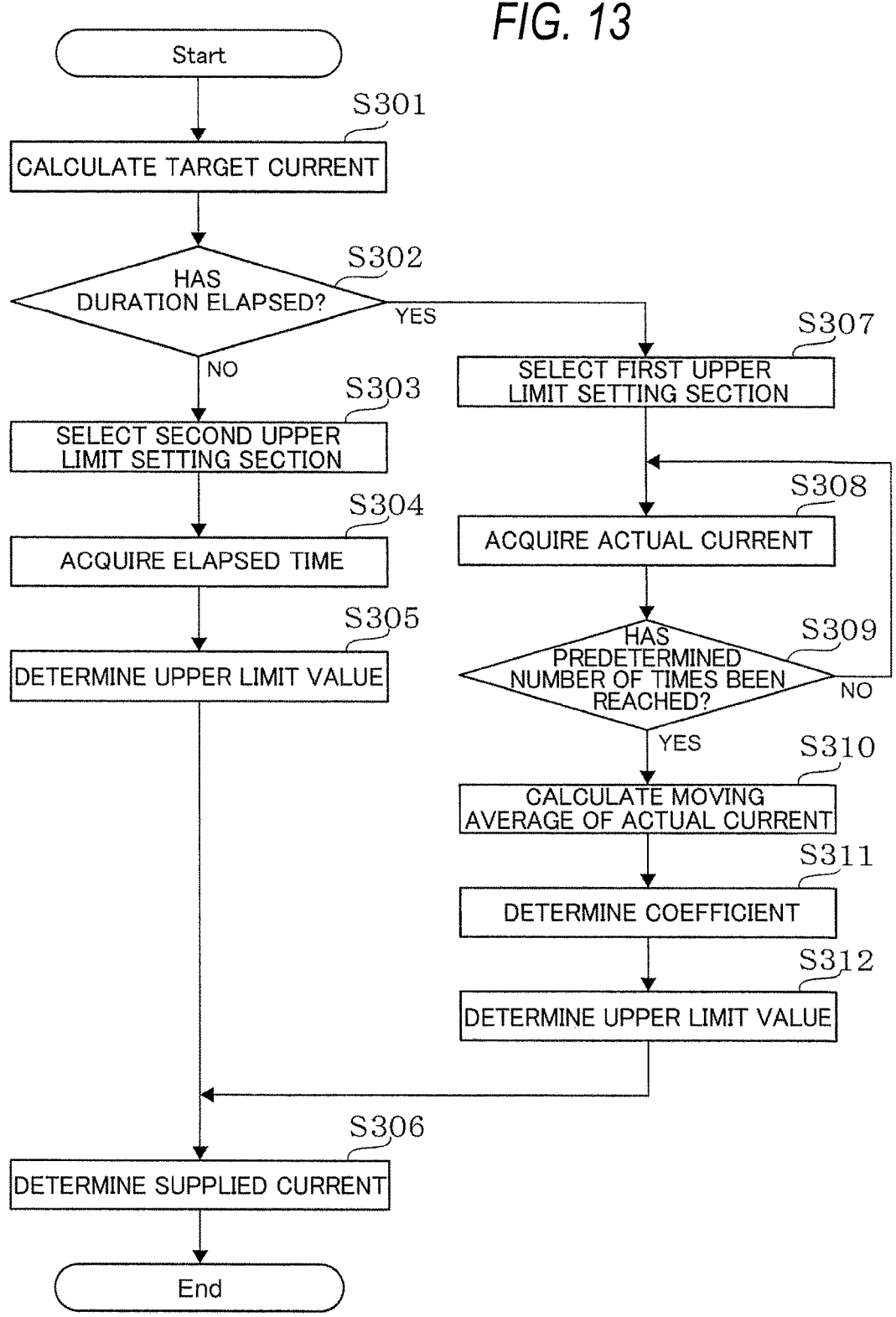
FIG. 13 is a flowchart illustrating operations of the supplied current calculating section according to the third embodiment.

FIG. 13 is a flowchart illustrating the operations of the supplied current calculating section 160. The supplied current calculating section 160 repeatedly performs the operations at preset time intervals.

First, the target current determining section 161 references the map stored in the map storage section 162 to calculate a target current ITA from a vehicle speed Vc (step 301).

Then, the selection section 163a selects the first upper limit setting section 163b or the second upper limit setting section 163c to determine the upper limit value. This is achieved by, for example, determining whether or not the preset duration has elapsed from the power-on of the control apparatus 150 as described above (step 302).

When the preset duration has not elapsed (step 302, No), the selection section 163a selects the second upper limit setting section 163c (step 303).

Then, the second upper limit setting section 163c acquires the elapsed time from the power-off of the control apparatus 150, from the time measuring section 164. The second upper limit setting section 163c also acquires, from the upper limit value storage section 165, the upper limit value obtained at the time of the last power-off of the control apparatus 150 (step 304).

The second upper limit setting section 163c references the map stored in the map storage section 162 to determine the upper limit value from the upper limit value obtained at the time of the last power-off of the control apparatus 150 and the elapsed time from the last power-off (step 305).

Then, the supplied current determining section 166 compares the target current ITA calculated by the target current determining section 161 with the upper limit value set by the upper limit setting section 163 to determine a supplied current ITF (step 306).

On the other hand, when the preset duration has elapsed (step 302, Yes), the selection section 163a selects the first upper limit setting section 163b (step 307).

The first upper limit setting section 163b then acquires the actual current IM from a detection section 183 at preset time intervals (100 ms in the above-described example) (step 308).

The first upper limit setting section 163b then determines whether or not the number of values of the actual current IM acquired has reached a predetermined value (50 in the above-described example) (step 309).

When the number of values of the actual current IM acquired is smaller than the predetermined value (step 309, No), the process returns to step 308.

On the other hand, when the number of values of the actual current IM acquired has reached the predetermined value (step 309, Yes), the first upper limit setting section 163b calculates the moving average of the actual current IM (step 310).

The first upper limit setting section 163b references the map stored in the map storage section 162 and the contents of which are as depicted in FIG. 6, to determine the coefficient from the moving average of the actual current IM (step 311).

The first upper limit setting section 163b then applies the coefficient to the last determined upper limit value to determine a new upper limit value (step 312). At this time, the first upper limit setting section 163b increases the upper limit value when the moving average of the actual current IM is smaller than a first threshold X1, and reduces the upper limit value when the moving average of the actual current IM is larger than a second threshold X2 set equal to or larger than the first threshold X1. Furthermore, the first upper limit setting section 163b maintains the upper limit value when the moving average of the actual current IM is equal to or larger than the first threshold X1 and equal to or smaller than the second threshold X2.

Then, the supplied current determining section 166 compares the target current ITA calculated by the target current determining section 161 with the upper limit value set by the upper limit setting section 163 to determine the supplied current ITF (step 306). At this time, the supplied current determining section 166 may perform the minimum select. The supplied current determining section 166 also determines whether the supplied current ITF exceeds the upper limit (2 A in the above-described example) of the actual current IM. When the supplied current ITF exceeds the upper limit, the supplied current determining section 166 may execute a process of limiting the supplied current ITF to the upper limit.

In the above-described supplied current calculating section 160, in an initial stage when the control apparatus 150 starts operating, the appropriate upper limit value can be set by using the second upper limit setting section 163c. Subsequently, the upper limit value is set using the first upper limit setting section 163b. In this case, when the moving average of the actual current IM continuously remains in a limited region, the upper limit value of the supplied current ITF gradually decreases. As a result, the supplied current ITF is limited and gradually decreases. Then, the moving average of the actual current IM settles at the vicinity of the second threshold X2 described above. This suppresses heat generation in the coil 511, making the coil 511 unlikely to be short-circuited. That is, even when the target current ITA continuously remains large, the actual current IM actually supplied to the coil 511 is limited to allow suppression of heat generation in the coil 511.

[Fourth Embodiment]

Now, a fourth embodiment will be described in detail focusing on differences from the first embodiment.

Figure 14:
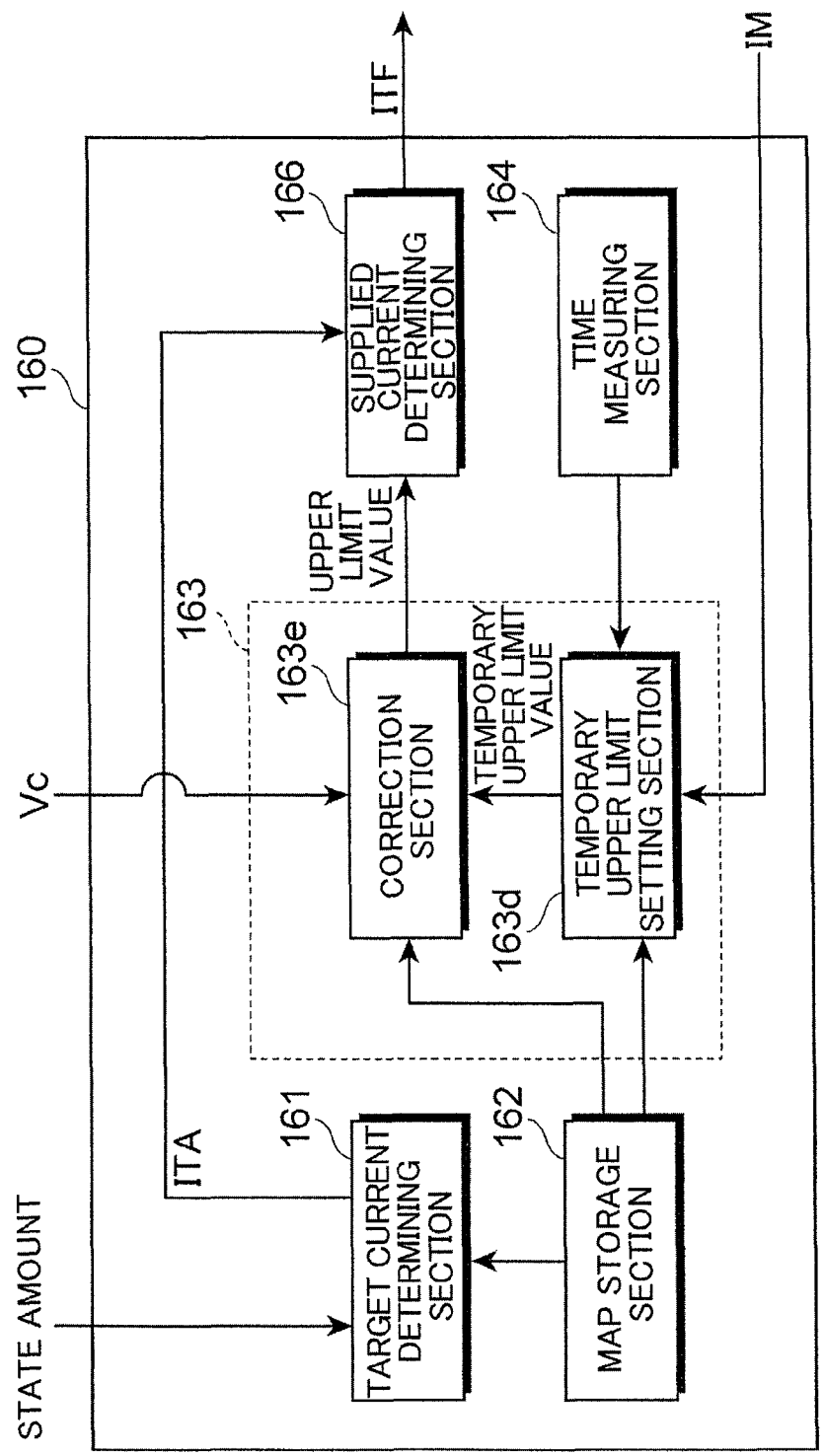
FIG. 14 is a block diagram of a supplied current calculating section according to a fourth embodiment.

FIG. 14 is a block diagram of a supplied current calculating section 160 in the present embodiment.

As depicted in FIG. 14, the supplied current calculating section 160 of the present embodiment includes a target current determining section 161, a map storage section 162, an upper limit setting section 163, a time measuring section 164, and a supplied current determining section 166. In this regard, the supplied current calculating section 160 of the present embodiment is similar to the supplied current calculating section 160 in FIG. 5.

The sections other than the upper limit setting section 163 are similar to the corresponding sections in FIG. 5. Hence, the following description focuses on the contents of the upper limit setting section 163.

The upper limit setting section 163 sets an upper limit value for a current supplied to a solenoid valve 50. The upper limit setting section 163 determines the upper limit value based on an actual current IM and a vehicle speed Vc of a vehicle 100.

In the present embodiment, the upper limit setting section 163 includes a temporary upper limit setting section 163d and a correction section 163e.

The temporary upper limit setting section 163d performs operations similar to the operations of the upper limit setting section 163 in FIG. 5. In other words, the temporary upper limit setting section 163d determines the upper limit value based on an already determined supplied current for a solenoid valve 50. Specifically, the temporary upper limit setting section 163d determines a coefficient that increases or reduces the upper limit value from a calculated moving average of the actual current IM. The relation between the moving average of the actual current IM and the coefficient is, for example, stored in the map storage section 162 as a map. With reference to the map, the temporary upper limit setting section 163d can determine the coefficient that increases or reduces the upper limit value from the moving average of the actual current IM. The relation between the moving average of the actual current IM and the coefficient is similar to the corresponding relation illustrated in FIG. 6.

The correction section 163e corrects a temporary upper limit value based on the vehicle speed Vc of the vehicle 100 to determine a final upper limit value.

In this case, the correction section 163e corrects the temporary upper limit value. The correction section 163e reduces and increases the amount by which the temporary upper limit value is corrected (correction amount), in proportion to the vehicle speed Vc of the vehicle 100. In other words, particularly in a limited region, the final upper limit value increases and decreases in proportion to the vehicle speed Vc of the vehicle 100.

When the vehicle speed Vc of the vehicle 100 is high, a coil 511 in a solenoid valve 50 is cooled by an airflow received by the vehicle 100 during traveling. Thus, when the vehicle speed Vc of the vehicle 100 is higher, it is not so necessary to keep the upper limit value small. On the other hand, when the vehicle speed Vc of the vehicle 100 is lower, the upper limit value needs to be kept small to suppress heat generation in the coil 511. Thus, in the present embodiment, the correction section 163e corrects the temporary upper limit value based on the vehicle speed Vc of the vehicle 100, and increases and reduces the upper limit value in proportion to the vehicle speed Vc of the vehicle 100.

Furthermore, the correction section 163e may change the correction amount based on the moving average of the actual current IM. In this case, the correction section 163e reduces and increases the correction amount in proportion to the actual current IM. For example, the correction amount is reduced for a recovery region and increased for the limited region. Furthermore, for a balanced region, the correction amount is set to a value between the correction amount for the recovery region and the correction amount for the limited region. In other words, in a region with a larger moving average of the actual current IM, the coil 511 is expected to have a higher temperature, and in that case, a cooling effect based on the vehicle speed Vc has a higher impact. Thus, it is more necessary to increase the correction amount. On the other hand, in a region with a smaller moving average of the actual current IM, the coil 511 is expected not to have a very high temperature, and the cooling effect based on the vehicle speed Vc has a low impact. Hence, a small correction amount may be used. Moreover, for a region with a small moving average of the actual current IM, the correction may be omitted. For example, the correction may be omitted for the recovery region and the balanced region and performed for the limited region.

[Description of Operations of the Fourth Embodiment of the Supplied Current Calculating Section 160]

Now, operations of the supplied current calculating section 160 will be described.

Figure 15:
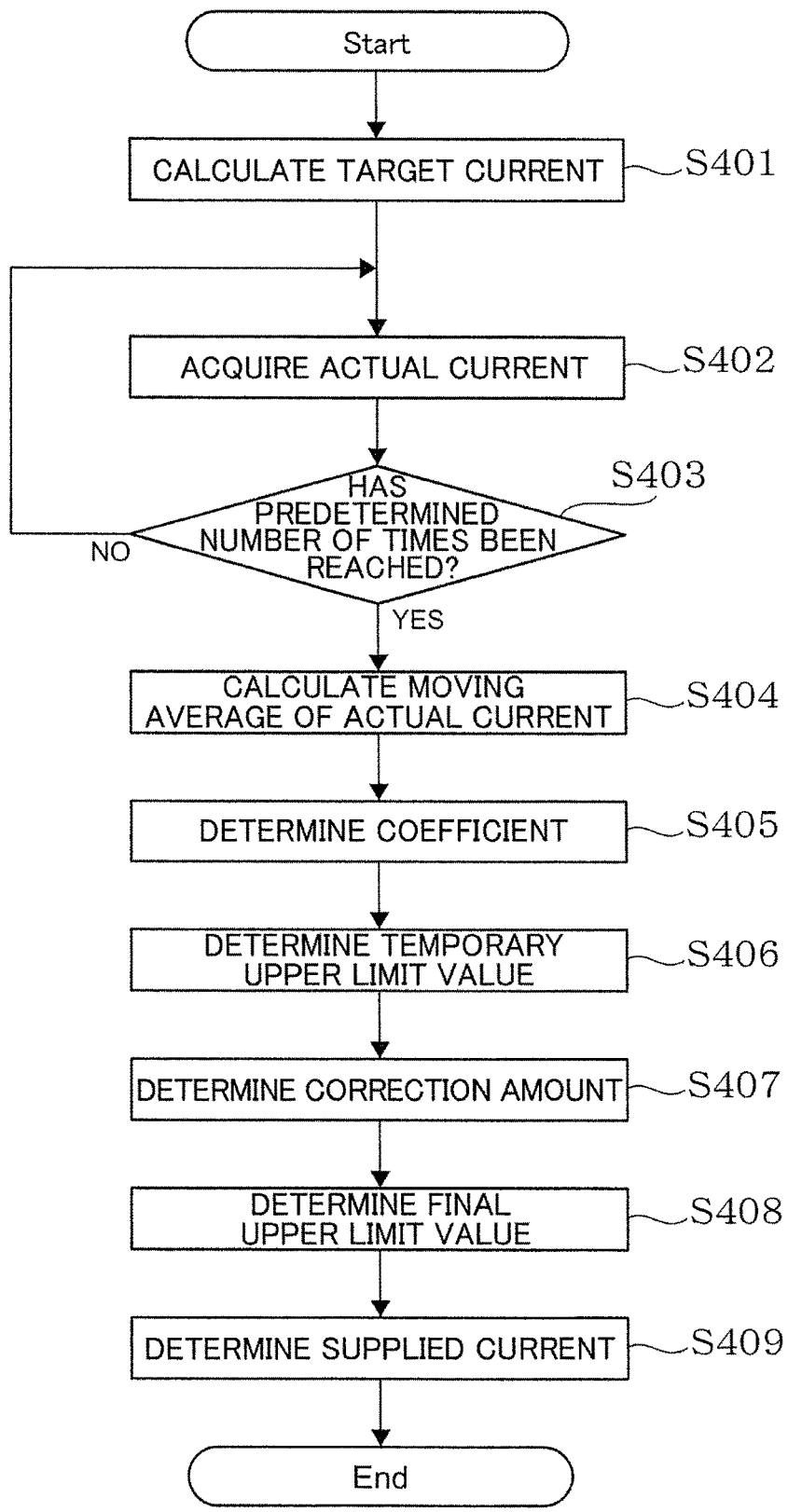
FIG. 15 is a flowchart illustrating operations of the supplied current calculating section according to the fourth embodiment.

FIG. 15 is a flowchart illustrating the operations of the supplied current calculating section 160. The supplied current calculating section 160 repeatedly performs the operations at preset time intervals.

First, the target current determining section 161 references the map stored in the map storage section 162 to calculate a target current ITA from the vehicle speed Vc (step 401).

The temporary upper limit setting section 163d then acquires the actual current IM from a detection section 183 at preset time intervals (100 ms in the above-described example) (step 402).

The temporary upper limit setting section 163d then determines whether or not the number of values of the actual current IM acquired has reached a predetermined value (50 in the above-described example) (step 403).

When the number of values of the actual current IM acquired is smaller than the predetermined value (step 403, No), the process returns to step 402.

On the other hand, when the number of values of the actual current IM acquired has reached the predetermined value (step 403, Yes), the upper limit setting section 163 calculates the moving average of the actual current IM (step 404).

The upper limit setting section 163 references the map stored in the map storage section 162 and the contents of which are as depicted in FIG. 6, to determine the coefficient from the moving average of the actual current IM (step 405).

The upper limit setting section 163 then applies the coefficient to the last determined upper limit value to determine a new upper limit value (step 406). At this time, the upper limit setting section 163 increases the upper limit value when the moving average of the actual current IM is smaller than a first threshold X1, and reduces the upper limit value when the moving average of the actual current IM is larger than a second threshold X2 set equal to or larger than the first threshold X1. Furthermore, the upper limit setting section 163 maintains the upper limit value when the moving average of the actual current IM is equal to or larger than the first threshold X1 and equal to or smaller than the second threshold X2.

Furthermore, the correction section 163e determines the correction amount by which the upper limit value is corrected based on the vehicle speed Vc or the moving average of the actual current IM (step 407). Moreover, the correction section 163e applies the correction amount to the temporary upper limit value to determine the final upper limit value (step 408).

Then, the supplied current determining section 166 compares the target current ITA calculated by the target current determining section 161 with the upper limit value set by the upper limit setting section 163 to determine the supplied current ITF (step 409). At this time, the supplied current determining section 166 may perform the minimum select. The supplied current determining section 166 also determines whether the supplied current ITF exceeds the upper limit (2 A in the above-described example) of the actual current IM. When the supplied current ITF exceeds the upper limit, the supplied current determining section 166 may execute a process of limiting the supplied current ITF to the upper limit.

In the above-described supplied current calculating section 160, when the moving average of the actual current IM continuously remains in the limited region, the upper limit value of the supplied current ITF gradually decreases. As a result, the supplied current ITF is limited and gradually decreases. Then, the moving average of the actual current IM settles at the vicinity of the second threshold X2 described above. This suppresses heat generation in the coil 511, making the coil 511 unlikely to be short-circuited. That is, even when the target current ITA continuously remains large, the actual current IM actually supplied to the coil 511 is limited to allow suppression of heat generation in the coil 511.

[Fifth Embodiment]

Now, a fifth embodiment will be described focusing on differences from the first embodiment.

The present embodiment is similar to the embodiment in FIG. 5 except for the upper limit setting section 163. Hence, the following description focuses on the contents of the upper limit setting section 163.

The upper limit setting section 163 sets an upper limit value for a current supplied to a solenoid valve 50. The upper limit setting section 163 determines the upper limit value based on an already determined supplied current.

However, unlike in the above description, two maps defining the relation between a moving average of an actual current IM and a coefficient are provided to allow the coefficient for a recovery region to be changed.

Figure 16:
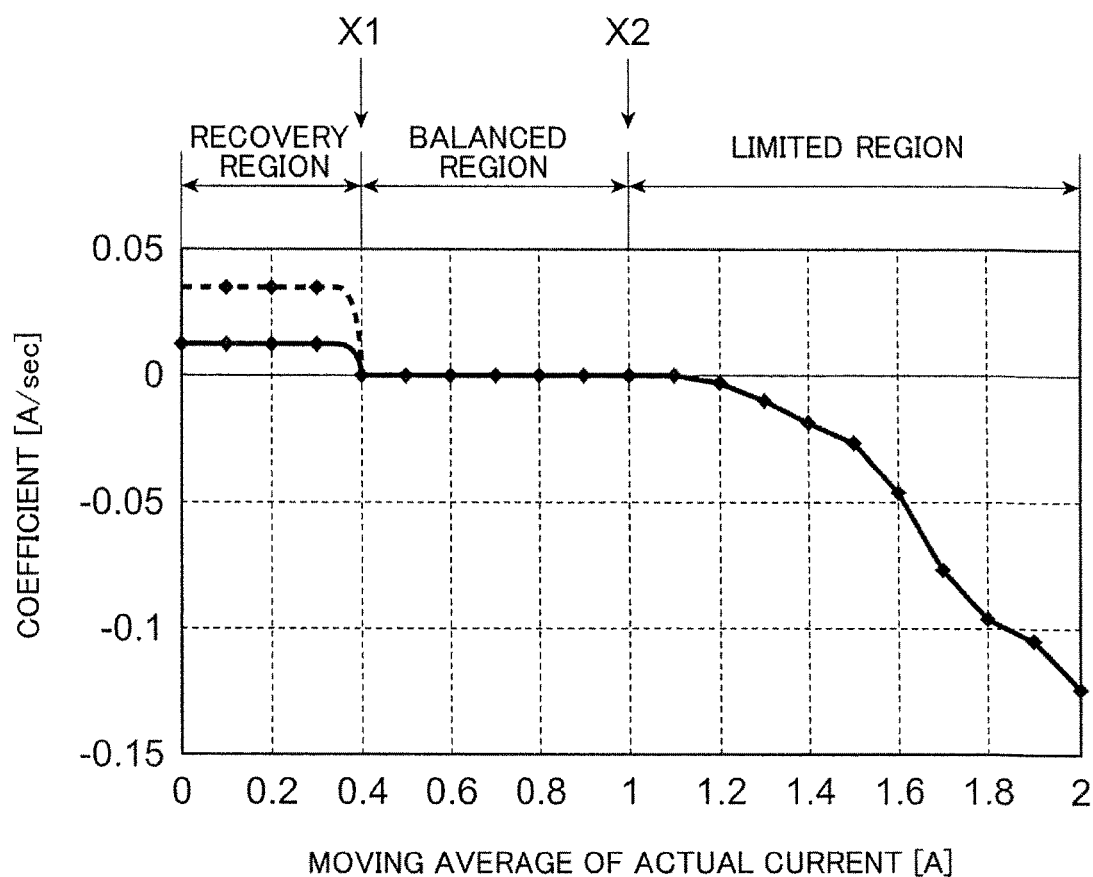
FIG. 16 is a diagram depicting the relation between the moving average of an actual current IM and a coefficient according to a fifth embodiment.

FIG. 16 is a diagram depicting the relation between the moving average of the actual current IM and the coefficient in the embodiment. In FIG. 16, the axis of abscissas represents the moving average of the actual current IM, and the axis of ordinate represents the coefficient.

In this regard, the two maps are a map corresponding to a case illustrated by a solid line in a recovery region and a map corresponding to a case illustrated by a dotted line in the recovery region. In other words, the former is a map in which a smaller coefficient is set for the recovery region, whereas the latter is a map in which a larger coefficient is set for the recovery region. In both cases, the same coefficient is used for the balanced region and the limited region.

The two maps are thus used for the recovery region in order to match the setting of the upper limit value with a radiation property of the coil 511 as described below.

Figure 17:
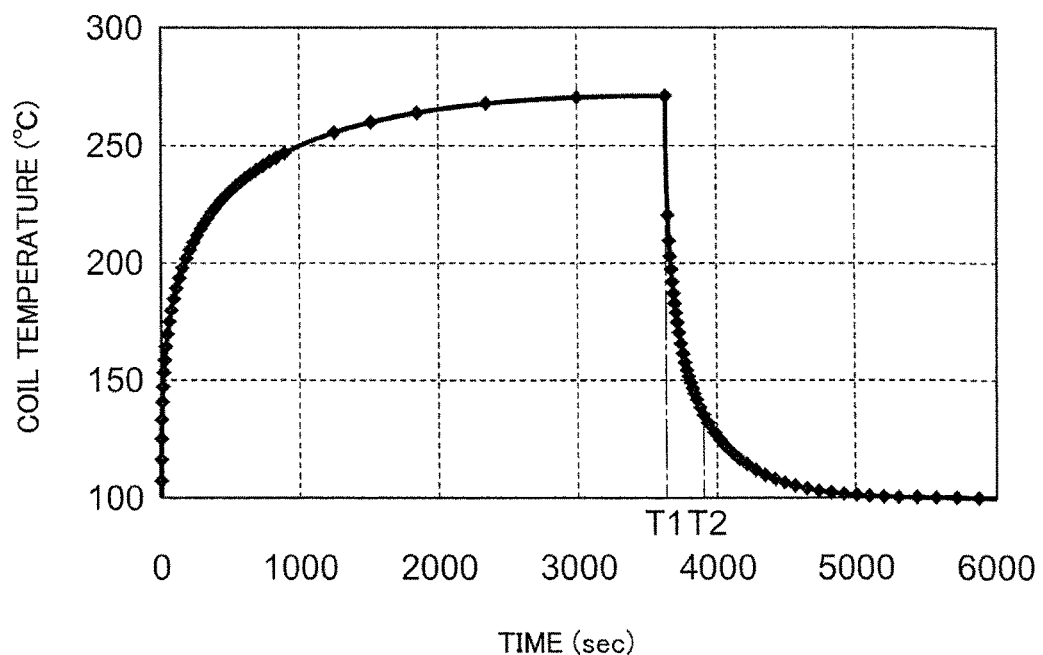
FIG. 17 is a diagram depicting the relation between a heat generation property and a heat radiation property of a coil according to the fifth embodiment.

FIG. 17 is a diagram illustrating a heating property and a radiation property of the coil 511. In FIG. 17, the axis of abscissas represents time, and the axis of ordinate represents the temperature of the coil 511.

A period from time 0 to time T1 depicted in FIG. 17 is a heat generation period of the coil 511. The heat generation period indicates a case where a large actual current IM is supplied to the coil 511, which generates heat to elevate the temperature. Furthermore, a period following time T1 is a heat radiation period of the coil 511. The heat radiation period indicates a case where a small actual current IM is supplied to the coil 511, which radiates heat to lower the temperature.

In this case, a temperature elevation curve for the heat generation period and a temperature lowering curve for the heat radiation period are both similar to a quadratic curve. In other words, during the heat generation period, the temperature elevates rapidly in a low-temperature region, and as the temperature becomes higher, the elevation of the temperature is slowed, resulting in gradual elevation of the temperature. On the other hand, during the heat radiation period, the temperature lowers rapidly in a high-temperature region, and as the temperature becomes lower, the lowering of the temperature is slowed, resulting in gradual lowering of the temperature.

In other words, in a region with a small actual current IM such as the recovery region, the temperature of the coil 511 changes as in a period following time T1 in FIG. 17. At this time, when a small coefficient is set for the recovery region as depicted by a solid line in FIG. 16, the upper limit value may be kept small because the upper limit value only gradually increases even when the temperature of the coil 511 has already lowered.

Hence, in order to set the upper limit value to match the heat radiation property of the coil 511, a large coefficient is set for a period during which the temperature of the coil 511 lowers rapidly, to allow the upper limit value to increase faster. In contrast, a small coefficient is set for a period during which the temperature of the coil 511 gradually lowers, to allow the upper limit value to increase more slowly. That is, a map in which a larger coefficient is set for the recovery region and a map in which a smaller coefficient is set for the recovery region are prepared and either of the two maps is used depending on the situation. In other words, when an already determined supplied current is equal to or smaller than a preset threshold, the upper limit setting section 163 changes the amount by which a newly set upper limit value is increased in accordance with the already set upper limit value.

Figure 18:
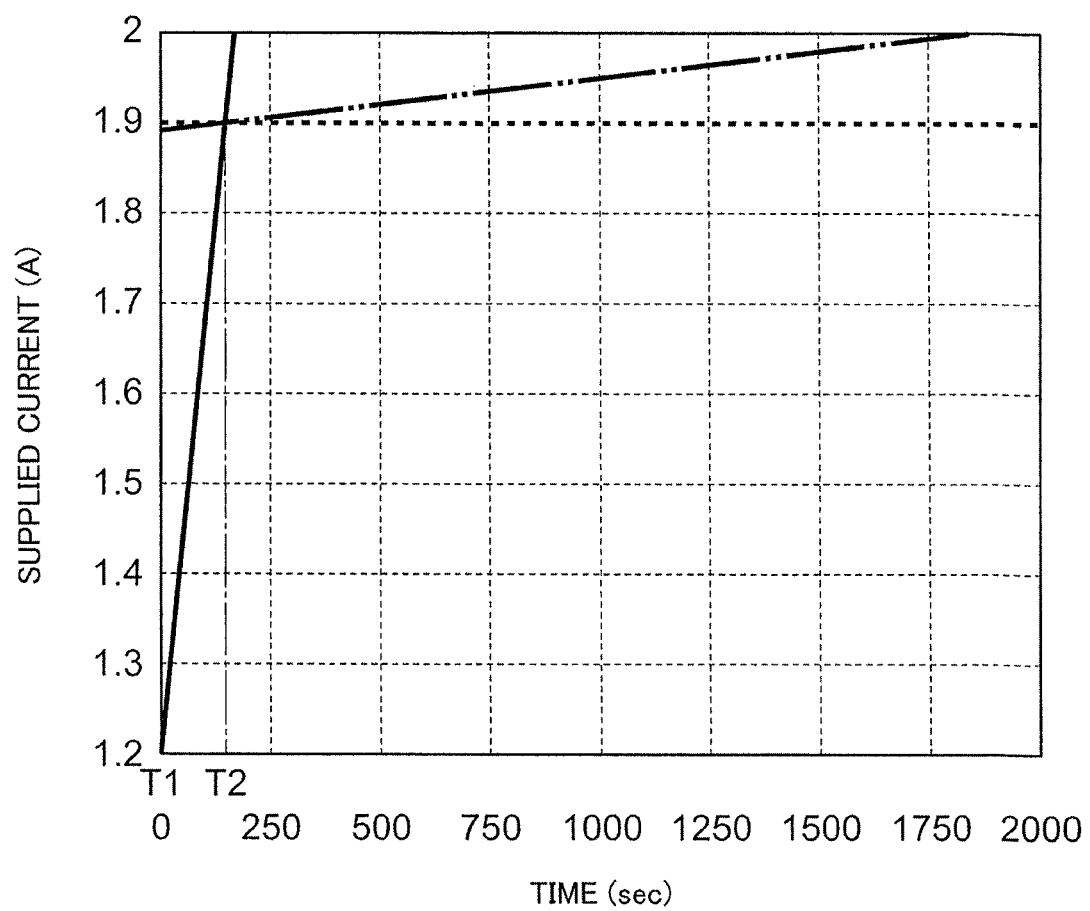
FIG. 18 is a diagram depicting an example of a change in supplied current in a case where two types of maps are used for a recovery area in the fifth embodiment.

FIG. 18 is a diagram depicting an example of changes in a supplied current ITF in a case where the two maps are used for the recovery region. In FIG. 18, the axis of abscissas represents time, and the axis of ordinate represents a supplied current ITF.

As depicted in FIG. 18, during a period from time T1 to time T2, the upper limit value increases faster. In this case, a slope corresponds to the coefficient. Here, the map depicted by the dotted line in FIG. 16 is applied to set a larger coefficient. Furthermore, during a period following time T2, the upper limit value increases more slowly. Here, the map depicted by the solid line in FIG. 16 is applied to set a smaller coefficient. In connection with which of the maps to apply, a preset switching current value is provided for the moving average of the actual current IM, and the map depicted by the dotted line in FIG. 16 is applied when the moving average of the actual current IM is equal to or smaller than the switching current value. When the moving average of the actual current IM exceeds the switching current value, the map depicted by the solid line in FIG. 16 is applied. In the example illustrated in FIG. 18, the switching current value is 1.9 A.

[Description of Operations of the Fifth Embodiment of the Current Calculating Section 160]

Now, operations of the supplied current calculating section 160 will be described.

Figure 19:
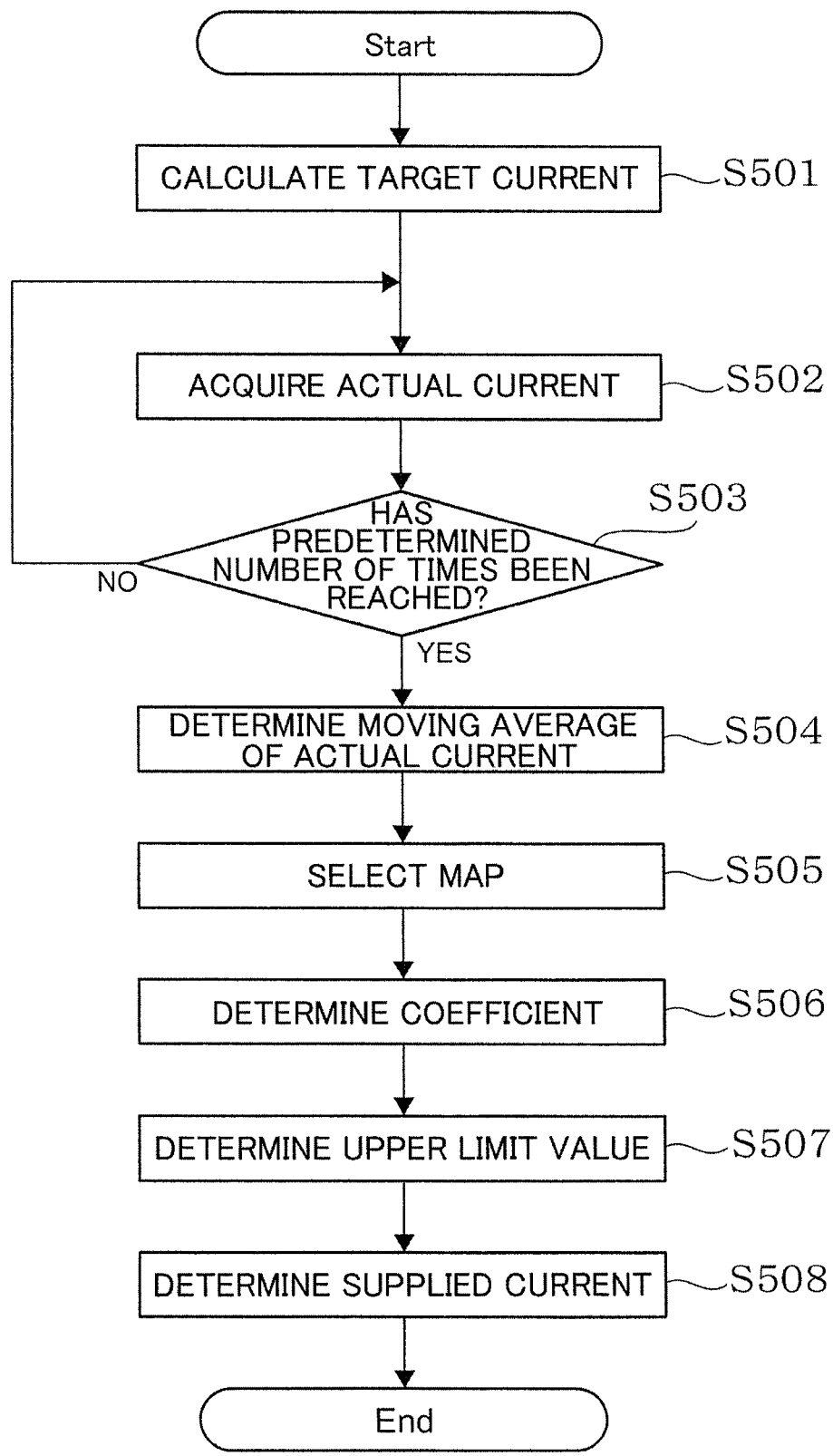
FIG. 19 is a flowchart illustrating operations of a supplied current calculating section according to the fifth embodiment.

FIG. 19 is a flowchart illustrating the operations of the supplied current calculating section 160. The supplied current calculating section 160 repeatedly performs the operations at preset time intervals.

First, the target current determining section 161 references the maps stored in the map storage section 162 to calculate a target current ITA from a vehicle speed Vc (step 501).

The upper limit setting section 163 then acquires the actual current IM from a detection section 183 at preset time intervals (100 ms in the above-described example) (step 502).

The upper limit setting section 163 then determines whether or not the number of values of the actual current IM acquired has reached a predetermined value (50 in the above-described example) (step 503).

When the number of values of the actual current IM acquired is smaller than the predetermined value (step 503, No), the process returns to step 502.

On the other hand, when the number of values of the actual current IM acquired has reached the predetermined value (step 503, Yes), the upper limit setting section 163 calculates the moving average of the actual current IM (step 504).

Then, the upper limit setting section 163 selects one of the two maps depicted in FIG. 16 in accordance with the moving average of the actual current IM (step 505).

The upper limit setting section 163 references the map stored in the map storage section 162 and the contents of which are as depicted in FIG. 6, to determine the coefficient from the moving average of the actual current IM (step 506).

The upper limit setting section 163 then applies the coefficient to the last determined upper limit value to determine a new upper limit value (step 507). At this time, the upper limit setting section 163 increases the upper limit value when the moving average of the actual current IM is smaller than a first threshold X1, and reduces the upper limit value when the moving average of the actual current IM is larger than a second threshold X2 set equal to or larger than the first threshold X1. Furthermore, the upper limit setting section 163 maintains the upper limit value when the moving average of the actual current IM is equal to or larger than the first threshold X1 and equal to or smaller than the second threshold X2.

Then, the supplied current determining section 166 compares the target current ITA calculated by the target current determining section 161 with the upper limit value set by the upper limit setting section 163 to determine the supplied current ITF (step 508). At this time, the supplied current determining section 166 may perform the minimum select. The supplied current determining section 166 also determines whether the supplied current ITF exceeds the upper limit (2 A in the above-described example) of the actual current IM. When the supplied current ITF exceeds the upper limit, the supplied current determining section 166 may execute a process of limiting the supplied current ITF to the upper limit.

In the above-described supplied current calculating section 160, when the moving average of the actual current IM continuously remains in the limited region, the upper limit value of the supplied current ITF gradually decreases. As a result, the supplied current ITF is limited and gradually decreases. Then, the moving average of the actual current IM settles at the vicinity of the second threshold X2 described above. This suppresses heat generation in the coil 511, making the coil 511 unlikely to be short-circuited. That is, even when the target current ITA continuously remains large, the actual current IM actually supplied to the coil 511 is limited to allow suppression of heat generation in the coil 511.

What is claimed is:

1. A damping force varying damper system comprising:
a damping force varying damper with a solenoid valve that adjusts a damping force; and
a control apparatus that controls the solenoid valve,
wherein the control apparatus includes:
a target current determining section that determines a target current supplied to a solenoid valve that controls a damping force of the damping force varying damper;
an upper limit setting section that sets an upper limit value for a current supplied to the solenoid valve; and
a supplied current determining section that determines a supplied current supplied to the solenoid valve, from the target current and the upper limit value,
the upper limit setting section determines a coefficient that increases or reduces the upper limit value based on an already determined supplied current and then determines the upper limit value from the coefficient, and
the upper limit setting section determines the coefficient from a moving average of the already determined supplied current over a preset time.

2. The damping force varying damper system according to claim 1, wherein the upper limit setting section increases the upper limit value when the moving average of the already determined supplied current is smaller than a first threshold, and
the upper limit setting section reduces the upper limit value when the moving average of the already determined supplied current is larger than a second threshold set equal to or larger than the first threshold.

3. The damping force varying damper system according to claim 2, wherein the upper limit setting section maintains the upper limit value when the moving average of the already determined supplied current is equal to or larger than the first threshold and equal to or smaller than the second threshold.

4. The damping force varying damper system according to claim 1, wherein the damping force varying damper is provided in plurality, and the solenoid valve is provided in plurality, and
the supplied current determining section selects a smallest one of the supplied currents determined for the plurality of the solenoid valves.

5. The damping force varying damper system according to claim 1, wherein the upper limit setting section comprises:
a first upper limit setting section that determines the upper limit value based on the already determined supplied current;
a second upper limit setting section that determines the upper limit value from a resistance value determined from an actual current and an actual voltage supplied to the solenoid valve; and
a selection section that selectively determines which of the first and second upper limit setting sections is used to determine the upper limit value.

6. The damping force varying damper system according to claim 5, wherein the selection section selects the second upper limit setting section until a duration has elapsed from power-on of the control apparatus and selects the first upper limit setting section after the duration elapses.

7. The damping force varying damper system according to claim 5, wherein the selection section selects the second upper limit setting section until a duration has elapsed from start of current supply to the solenoid valve and selects the first upper limit setting section after the duration elapses.

8. The damping force varying damper system according to claim 5, wherein the damping force varying damper is provided in plurality, and the solenoid valve is provided in plurality,
the control apparatus further comprises a detection section that detects the actual current and the actual voltage actually supplied to the plurality of solenoid valves, and
the detection section does not simultaneously detect the actual current or the actual voltage for each of the plurality of solenoid valves.

9. A damping force varying damper system comprising:
a damping force varying damper with a solenoid valve that adjusts a damping force; and
a control apparatus that controls the solenoid valve,
wherein the control apparatus includes:
a target current determining section that determines a target current supplied to a solenoid valve that controls a damping force of the damping force varying damper;
an upper limit setting section that sets an upper limit value for a current supplied to the solenoid valve; and
a supplied current determining section that determines a supplied current supplied to the solenoid valve, from the target current and the upper limit value,
wherein the upper limit setting section comprises:
a first upper limit setting section that determines the upper limit value based on an already determined supplied current;
a second upper limit setting section that determines the upper limit value from a resistance value determined from an actual current and an actual voltage supplied to the solenoid valve; and
a selection section that selectively determines which of the first and second upper limit setting sections is used to determine the upper limit value.

10. The damping force varying damper system according to claim 1, further comprising:
an upper limit value storage section that stores the upper limit value obtained at a time of last power-off of the control apparatus; and
a time measuring section that measures an elapsed time from the last power-off of the control apparatus,
wherein the upper limit setting section comprises:
a first upper limit setting section that determines upper limit value based on the already determined supplied current;
a second upper limit setting section that determines the upper limit value from the upper limit value obtained at the time of the last power-off of the control apparatus and stored in the upper limit value storage section, and the elapsed time measured by the time measuring section; and
a selection section that selectively determines which of the first and second upper limit setting sections is used to determine the upper limit value.

11. The damping force varying damper system according to claim 10, wherein the selection section selects the second upper limit setting section until a duration has elapsed from power-on of the control apparatus and selects the first upper limit setting section after the duration elapses.

12. The damping force varying damper system according to claim 10, wherein the selection section selects the second upper limit setting section until a duration has elapsed from start of current supply to the solenoid valve and selects the first upper limit setting section after the duration elapses.

13. A damping force varying damper system comprising:
a damping force varying damper with a solenoid valve that adjusts a damping force; and
a control apparatus that controls the solenoid valve,
wherein the control apparatus includes:
a target current determining section that determines a target current supplied to a solenoid valve that controls a damping force of the damping force varying damper;
an upper limit setting section that sets an upper limit value for a current supplied to the solenoid valve;
a supplied current determining section that determines a supplied current supplied to the solenoid valve, from the target current and the upper limit value;
an upper limit value storage section that stores the upper limit value obtained at a time of last power-off of the control apparatus; and
a time measuring section that measures an elapsed time from the last power-off of the control apparatus,
wherein the upper limit setting section comprises:
a first upper limit setting section that determines the upper limit value based on an already determined supplied current;
a second upper limit setting section that determines the upper limit value from the upper limit value obtained at the time of the last power-off of the control apparatus and stored in the upper limit value storage section, and the elapsed time measured by the time measuring section; and
a selection section that selectively determines which of the first and second upper limit setting sections is used to determine the upper limit value.

14. The damping force varying damper system according to claim 1, wherein the upper limit setting section comprises:

a temporary upper limit setting section that determines a coefficient that increases or reduces a temporary upper limit value based on the already determined supplied current to determine the temporary upper limit value from the coefficient; and a correction section that corrects the temporary upper limit value based on a speed of the vehicle to determine the upper limit value.

15. The damping force varying damper system according to claim 14, wherein the correction section of the upper limit setting section reduces and increases an amount of correction in proportion to the already determined supplied current.

16. The damping force varying damper system according to claim 14, wherein the correction section of the upper limit setting section reduces and increases an amount of correction in proportion to the speed of the vehicle.

17. A damping force varying damper system comprising:
a damping force varying damper with a solenoid valve that adjusts a damping force; and
a control apparatus that controls the solenoid valve,
wherein the control apparatus includes:
    a target current determining section that determines a target current supplied to a solenoid valve that controls a damping force of the damping force varying damper;
    an upper limit setting section that sets an upper limit value for a current supplied to the solenoid valve; and
    a supplied current determining section that determines a supplied current supplied to the solenoid valve, from the target current and the upper limit value,
the upper limit setting section determines the upper limit value based on an already determined supplied current and a speed of a vehicle,
the upper limit setting section comprises:
    a temporary upper limit setting section that determines a coefficient that increases or reduces a temporary upper limit value based on the already determined supplied current to determine the temporary upper limit value from the coefficient; and
    a correction section that corrects the temporary upper limit value based on a speed of the vehicle to determine the upper limit value.

18. The damping force varying damper system according to claim 1, wherein the upper limit setting section determines a coefficient that increases or reduces the upper limit value based on the already determined supplied current to determine the upper limit value from the coefficient, and
the upper limit setting section changes the coefficient in accordance with an already set upper limit value when the already determined supplied current is equal to or smaller than a threshold, to change an increase amount by which a newly set upper limit value is increased.

19. The damping force varying damper system according to claim 18, wherein the upper limit setting section sets a first increase amount as the increase amount when a last set upper limit value is equal to or smaller than a preset switching current value,
the upper limit setting section sets a second increase amount as the increase amount when the last set upper limit value exceeds the switching current value, and
the first increase amount is larger than the second increase amount.

20. A damping force varying damper system comprising:
a damping force varying damper with a solenoid valve that adjusts a damping force; and
a control apparatus that controls the solenoid valve,
wherein the control apparatus includes:
    a target current determining section that determines a target current supplied to a solenoid valve that controls a damping force of the damping force varying damper;
    an upper limit setting section that sets an upper limit value for a current supplied to the solenoid valve; and
    a supplied current determining section that determines a supplied current supplied to the solenoid valve, from the target current and the upper limit value,
the upper limit setting section changes an increase amount by which a newly set upper limit value is increased in accordance with an already set upper limit value when an already determined supplied current is equal to or smaller than a preset threshold,
the upper limit setting section determines a coefficient that increases or reduces the upper limit value based on the already determined supplied current to determine the upper limit value from the coefficient, and
the upper limit setting section changes the coefficient in accordance with an already set upper limit value when the already determined supplied current is equal to or smaller than a threshold, to change an increase amount by which a newly set upper limit value is increased.

21. A damping force varying damper system comprising:
a damping force varying damper with a solenoid valve that adjusts a damping force; and
a control apparatus that controls the solenoid valve,
wherein the control apparatus comprises:
    a target current determining section that determines a target current supplied to the solenoid valve;
    an upper limit setting section that sets an upper limit value for a current supplied to the solenoid valve; and
    a supplied current determining section that determines a supplied current supplied to the solenoid valve, from the target current and the upper limit value,
the upper limit setting section determines a coefficient that increases or reduces the upper limit value based on an already determined supplied current and determines the upper limit value from the coefficient and
the upper limit setting section determines the coefficient from an integral value of the already determined supplied current over a preset time.

22. The damping force varying damper system according to claim 21, wherein the upper limit setting section increases the upper limit value when the integral value of the already determined supplied current is smaller than a first threshold, and reduces the upper limit value when the integral value of the already determined supplied current is larger than a second threshold set equal to or larger than the first threshold.

23. The damping force varying damper system according to claim 22, wherein the upper limit setting section maintains the upper limit value when the integral value of the already determined supplied current is equal to or larger than the first threshold and equal to or smaller than the second threshold.

* * * * *